(12) United States Patent
Doumbouya et al.

(10) Patent No.: US 10,529,381 B2
(45) Date of Patent: Jan. 7, 2020

(54) METHOD, SYSTEM AND COMPUTER PROGRAM PRODUCT FOR INTERACTIVELY IDENTIFYING SAME INDIVIDUALS OR OBJECTS PRESENT IN VIDEO RECORDINGS

(71) Applicant: Avigilon Corporation, Vancouver (CA)

(72) Inventors: Moussa Doumbouya, Melrose, MA (US); Mahesh Saptharishi, Sudbury, MA (US); Eric Sjue, Vancouver (CA); Hannah Valbonesi, Burnaby (CA)

(73) Assignee: Avigilon Corporation, Vancouver (CA)

( * ) Notice: Subject to any disclaimer, the term of this patent is extended or adjusted under 35 U.S.C. 154(b) by 0 days.

(21) Appl. No.: 16/160,882

(22) Filed: Oct. 15, 2018

(65) Prior Publication Data

US 2019/0080722 A1 Mar. 14, 2019

Related U.S. Application Data

(62) Division of application No. 15/368,357, filed on Dec. 2, 2016, now Pat. No. 10,121,515.

(Continued)

(51) Int. Cl.
*H04N 9/80* (2006.01)
*G11B 27/22* (2006.01)
(Continued)

(52) U.S. Cl.
CPC ............ *G11B 27/22* (2013.01); *G06F 3/0482* (2013.01); *G06F 3/04847* (2013.01); *G06Q 10/00* (2013.01); *G06T 7/292* (2017.01); *G06T 7/74* (2017.01); *G11B 27/102* (2013.01); *G11B 27/28* (2013.01); *G11B 27/309* (2013.01);
(Continued)

(58) Field of Classification Search
CPC ......... G11B 27/22; G11B 27/28; G11B 27/34; G11B 27/3081; G11B 27/102; G11B 27/309; G06T 7/74; G06T 7/292; G06T 2207/30241; G06T 2207/30232; G06T 2207/30196; G06T 2207/20076;
(Continued)

(56) References Cited

U.S. PATENT DOCUMENTS 6,747,674 B1 6/2004 Asami
8,224,029 B2 7/2012 Saptharishi et al.
(Continued)

OTHER PUBLICATIONS

"Avigilon Control Center Client User Guide", Version: 4.10 Standard; 151 pages.
(Continued)

*Primary Examiner* — Helen Shibru
(74) *Attorney, Agent, or Firm* — Daniel Hammond

(57) ABSTRACT

A method, system and computer program product for interactively identifying same individuals or objects present in video recordings is disclosed. When a thumbnail in a set of thumbnails is selected, new information is obtained. The new information may be that an individual or object is present in the portion of the video recording associated with the thumbnail. A search can be carried out for the individual or object based on the new information. The search generates new match likelihoods for each of displayed thumbnails within a user interface page. The displayed thumbnails are re-ordered based on the new match likelihoods.

9 Claims, 23 Drawing Sheets

Related U.S. Application Data

(60) Provisional application No. 62/346,240, filed on Jun. 6, 2016, provisional application No. 62/351,806, filed on Jun. 17, 2016.

(51) Int. Cl.
*G06F 3/0482* (2013.01)
*G06F 3/0484* (2013.01)
*G11B 27/10* (2006.01)
*G11B 27/30* (2006.01)
*G11B 27/34* (2006.01)
*G06Q 10/00* (2012.01)
*G11B 27/28* (2006.01)
*H04N 7/18* (2006.01)
*G06T 7/292* (2017.01)
*G06T 7/73* (2017.01)

(52) U.S. Cl.
CPC .......... *G11B 27/3081* (2013.01); *G11B 27/34* (2013.01); *H04N 7/181* (2013.01); *H04N 7/188* (2013.01); *G06T 2207/10016* (2013.01); *G06T 2207/20076* (2013.01); *G06T 2207/30196* (2013.01); *G06T 2207/30232* (2013.01); *G06T 2207/30241* (2013.01)

(58) Field of Classification Search
CPC .......... G06T 2207/11016; H04N 7/188; H04N 7/181; G06Q 10/00; G06F 3/0482; G06F 3/04847
USPC .......... 386/241–242, 258, 226, 228
See application file for complete search history.

(56) References Cited

U.S. PATENT DOCUMENTS

| | | |
|---|---|---|
| 8,655,020 B2 | 2/2014 | Saptharishi et al. |
| 8,743,205 B2 | 6/2014 | Yehezkel et al. |
| 8,934,709 B2 | 1/2015 | Saptharishi et al. |
| 9,076,042 B2 | 7/2015 | Saptharishi et al. |
| 9,113,128 B1 | 8/2015 | Aliverti et al. |
| 9,240,164 B2 | 1/2016 | Cupitt et al. |
| 9,317,753 B2 | 4/2016 | Saptharishi et al. |
| 9,697,425 B2 | 7/2017 | Saptharishi et al. |
| 9,984,300 B2 | 5/2018 | Miyano |
| 2004/0119848 A1* | 6/2004 | Buehler .............. G06K 9/00771 348/239 |
| 2007/0237493 A1 | 10/2007 | Hall et al. |
| 2008/0152298 A1 | 6/2008 | Ubillos |
| 2008/0170068 A1 | 7/2008 | Funaki et al. |
| 2008/0204569 A1 | 8/2008 | Miller et al. |
| 2008/0232681 A1 | 9/2008 | Feris et al. |
| 2008/0247609 A1 | 10/2008 | Feris et al. |
| 2008/0294663 A1 | 11/2008 | Heinley et al. |
| 2009/0034806 A1 | 2/2009 | Hayase |
| 2009/0089712 A1 | 4/2009 | Sato |
| 2009/0089713 A1 | 4/2009 | Tabe |
| 2009/0172545 A1 | 7/2009 | Yokoi |
| 2009/0238462 A1 | 9/2009 | Feris et al. |
| 2009/0244390 A1 | 10/2009 | Feris et al. |
| 2009/0249223 A1 | 10/2009 | Barsook et al. |
| 2009/0297119 A1 | 12/2009 | Takamori et al. |
| 2010/0002070 A1* | 1/2010 | Ahiska ............. G08B 13/19691 348/36 |
| 2010/0054535 A1 | 3/2010 | Brown et al. |
| 2010/0054540 A1 | 3/2010 | Brown et al. |
| 2010/0067741 A1* | 3/2010 | Stolkin ................ G06K 9/3241 382/103 |
| 2010/0106707 A1 | 4/2010 | Brown et al. |
| 2010/0146450 A1 | 6/2010 | Harada |
| 2010/0157049 A1* | 6/2010 | Dvir ................ G08B 13/19608 348/143 |
| 2012/0062732 A1 | 3/2012 | Marman et al. |
| 2012/0182479 A1 | 7/2012 | Sato |
| 2013/0073984 A1 | 3/2013 | Lessin et al. |
| 2013/0201329 A1 | 8/2013 | Thornton et al. |
| 2014/0328512 A1 | 11/2014 | Gurwicz et al. |
| 2015/0092054 A1 | 4/2015 | Saptharishi et al. |
| 2015/0222859 A1* | 8/2015 | Schweid ............. G06K 9/00624 348/148 |
| 2015/0310624 A1* | 10/2015 | Bulan ..................... G06K 9/66 382/103 |
| 2016/0034477 A1 | 2/2016 | Mao et al. |
| 2016/0110046 A1 | 4/2016 | Yao |
| 2016/0203367 A1* | 7/2016 | Oami ................. G06K 9/00711 382/103 |
| 2016/0224223 A1 | 8/2016 | Ren et al. |
| 2016/0259975 A1 | 9/2016 | Saptharishi et al. |
| 2017/0161569 A1* | 6/2017 | Ren ..................... G06K 9/00798 |
| 2017/0278289 A1* | 9/2017 | Marino ..................... G06T 7/44 |
| 2017/0300742 A1* | 10/2017 | Wei ..................... G06K 9/00288 |

OTHER PUBLICATIONS

Farenzena et al., "Person Re-Identification by Symmetry-Driven Accumulation of Local Features"; Dipartimento di Informatica, University of Verona, Italy; Istituto Italiano di Tecnologia (IIT), Genova, Italy; 9 pages.

Qognify Formerly Nice Security; Data Sheet; 2015; 4 pages.

International Search Report and Written Opinion dated Aug. 24, 2017, issued by the Canadian Intellectual Property Office in Patent Cooperation Treaty Application No. PCT/CA2017/050610, filed May 19, 2017.

* cited by examiner

METHOD, SYSTEM AND COMPUTER PROGRAM PRODUCT FOR INTERACTIVELY IDENTIFYING SAME INDIVIDUALS OR OBJECTS PRESENT IN VIDEO RECORDINGS

RELATED U.S. APPLICATION DATA

The present application is a divisional of U.S. patent application Ser. No. 15/368,357, filed on Dec. 2, 2016, which claims the benefit of priority of: i) provisional application No. 62/346,240 filed on Jun. 6, 2016; and ii) provisional application No. 62/351,806 filed on Jun. 17, 2016. The contents of all of the above-mentioned applications are hereby incorporated by reference in their entireties.

FIELD

The present subject-matter relates to identifying same individuals or objects appearing in a plurality of different video recordings and, in particular, to allowing a user to provide input into a computer terminal of a surveillance system in order to facilitate identifying same individuals or objects appearing in a plurality of different video recordings.

BACKGROUND

Intelligent processing and playback of recorded video is an important functionality to have in camera surveillance systems. The playback of recorded video may be useful to review and identify objects or persons of interest found in the video captured by the cameras. This may then be used for some security-related purpose or purpose such as, for example, locating the object or person of interest.

However, camera surveillance systems may have a large number of cameras that are each generating their own respective video feed. This may make the simultaneous review of these feeds during playback cumbersome, time consuming and expensive.

SUMMARY

According to one example embodiment, there is provided a method that includes displaying a plurality of sets of thumbnails. Each set of thumbnails includes one or more thumbnails positioned in a respective row or column which, along with the set of thumbnails, are defined by a unique time interval of a plurality of time intervals. Each thumbnail of each set of thumbnails is visually representative of an associated portion of a video recording taken at the defined time interval for the thumbnail. The one or more thumbnails in each set of thumbnails are organized in a descending order arrangement starting at one end of the respective row or column with a thumbnail corresponding to a highest likelihood, as compared to any other thumbnails of the set, of appearance of an individual or object having been identified as being of interest. Any remaining thumbnails in the set are displayed, in descending order, extending away from the thumbnail corresponding to the highest likelihood. The method also includes allowing selection of a first thumbnail in one of the sets of thumbnails to obtain new information that the individual or object is present in the portion of the video recording associated with the first thumbnail. The method also includes carrying out a search for the individual or object based on the new information, and the search generates new match likelihoods for each of the displayed thumbnails. The method also includes re-ordering the displayed thumbnails based on the new match likelihoods so as to maintain the descending order arrangement in each of the sets of thumbnails.

According to another example embodiment, there is provided a tangible, non-transitory, computer-readable storage medium having instructions encoded therein, wherein the instructions, when executed by at least one processor, cause a carrying out of a method that includes displaying a plurality of sets of thumbnails. Each set of thumbnails includes one or more thumbnails positioned in a respective row or column which, along with the set of thumbnails, are defined by a unique time interval of a plurality of time intervals. Each thumbnail of each set of thumbnails is visually representative of an associated portion of a video recording taken at the defined time interval for the thumbnail. The one or more thumbnails in each set of thumbnails are organized in a descending order arrangement starting at one end of the respective row or column with a thumbnail corresponding to a highest likelihood, as compared to any other thumbnails of the set, of appearance of an individual or object having been identified as being of interest. Any remaining thumbnails in the set are displayed, in descending order, extending away from the thumbnail corresponding to the highest likelihood. The method to be carried out by the instructions encoded in the storage medium also includes allowing selection of a first thumbnail in one of the sets of thumbnails to obtain new information that the individual or object is present in the portion of the video recording associated with the first thumbnail. The method to be carried out by the instructions encoded in the storage medium also includes sending a request to a server to search for the individual or object based on the new information. The search generates new match likelihoods for each of the displayed thumbnails. The method to be carried out by the instructions encoded in the storage medium also includes re-ordering the displayed thumbnails based on the new match likelihoods so as to maintain the descending order arrangement in each of the sets of thumbnails.

According to another example embodiment, there is provided a method that includes providing a user interface which includes a video player for displaying video frames of a video. The video frames include a number of frame regions within which there are respective moving bodies of matter. The frame regions are selectable for receiving user input. The method also includes receiving search-requesting input through the user interface to carry out a search for an individual or object present in a selected frame region of the frame regions. The method also includes generating or re-computing a plurality of match likelihoods assigned to a plurality of individuals or objects present in video recordings. The match likelihoods are likelihoods of there being an appearance of the individual or object. The method also includes populating or updating a user interface page of the user interface to display information corresponding to the generated or re-computed match likelihoods.

According to another example embodiment, there is provided a tangible, non-transitory, computer-readable storage medium having instructions encoded therein, wherein the instructions, when executed by at least one processor, cause a carrying out of a method that includes providing a user interface which includes a video player for displaying video frames of a video. The video frames include a number of frame regions within which there are respective moving bodies of matter. The frame regions are selectable for receiving user input. The method to be carried out by the instructions encoded in the storage medium also includes receiving search-requesting input through the user interface to carry out a search for an individual or object present in a selected frame region of the frame regions. The method to be carried out by the instructions encoded in the storage medium also includes sending a request to a server to generate or re-compute a plurality of match likelihoods assigned to a plurality of individuals or objects present in video recordings. The match likelihoods are likelihoods of there being an appearance of the individual or object. The method to be carried out by the instructions encoded in the storage medium also includes populating or updating a user interface page of the user interface to display information corresponding to the generated or re-computed match likelihoods.

According to another example embodiment, there is provided a method that includes displaying a two dimensional graph having date and time along the x-axis and, along the y-axis, a listing of a plurality of camera identifications of video cameras with respect to which a respective plurality of video recordings of the video cameras are available for viewing. The video recordings have portions within which there is an above-threshold likelihood of appearance of an individual or object having been identified as being of interest. The method also includes plotting, based on the plurality of camera identifications and times on the x-axis associated with the portions of the video recordings, n image thumbnails on the two dimensional graph, where n is an integer greater than two. The n image thumbnails are visually representative of the portions of the video recordings. A first of the n thumbnails is shown earliest in time along the x-axis and the nth thumbnail is shown latest in time along the x-axis. The method also includes allowing selection of at least one of the n image thumbnails to be removed from the two dimensional graph. The method also includes removing the at least one of the n image thumbnails from the two dimensional graph. The method also includes recording that the individual or object is absent in the portion of the video recording associated with the removed thumbnail.

According to another example embodiment, there is provided a tangible, non-transitory, computer-readable storage medium having instructions encoded therein, wherein the instructions, when executed by at least one processor, cause a carrying out of a method that includes displaying a two dimensional graph having date and time along the x-axis and, along the y-axis, a listing of a plurality of camera identifications of video cameras with respect to which a respective plurality of video recordings of the video cameras are available for viewing. The video recordings have portions within which there is an above-threshold likelihood of appearance of an individual or object having been identified as being of interest. The method to be carried out by the instructions encoded in the storage medium also includes plotting, based on the plurality of camera identifications and times on the x-axis associated with the portions of the video recordings, n image thumbnails on the two dimensional graph, where n is an integer greater than two. The n image thumbnails are visually representative of the portions of the video recordings, and a first of the n thumbnails is shown earliest in time along the x-axis and the nth thumbnail is shown latest in time along the x-axis. The method to be carried out by the instructions encoded in the storage medium also includes allowing selection of at least one of the n image thumbnails to be removed from the two dimensional graph. The method to be carried out by the instructions encoded in the storage medium also includes removing the at least one of the n image thumbnails from the two dimensional graph. The method to be carried out by the instructions encoded in the storage medium also includes recording that the individual or object is absent in the portion of the video recording associated with the removed thumbnail.

BRIEF DESCRIPTION OF THE DRAWINGS

Reference will now be made, by way of example, to the accompanying drawings.

Similar or the same reference numerals may have been used in different figures to denote similar example features illustrated in the drawings.

DETAILED DESCRIPTION OF EXAMPLE EMBODIMENTS

Figure 1:
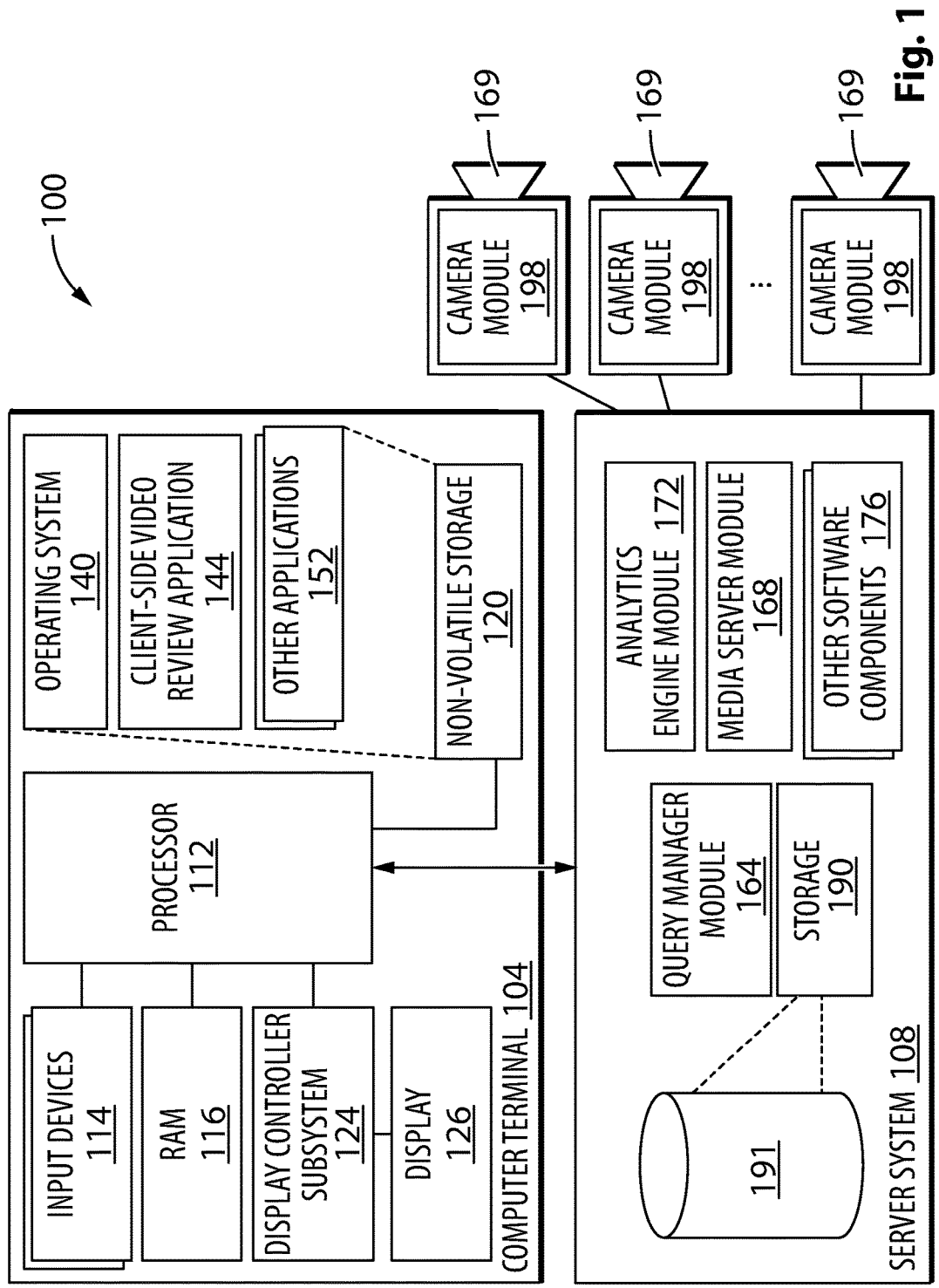
FIG. 1 shows a block diagram of an example surveillance system within which methods in accordance with example embodiments can be carried out.

It will be understood that when an element is herein referred to as being "connected", "in communication with" or "coupled" to another element, it can be directly connected, directly in communication with or directly coupled to the other element or intervening elements may be present. In contrast, when an element is herein referred to as being "directly connected", "directly in communication with" or "directly coupled" to another element, there are no intervening elements present. Other words used to describe the relationship between elements should be interpreted in a like fashion (i.e., "between" versus "directly between", "adjacent" versus "directly adjacent", etc.).

As will be appreciated by one skilled in the art, the various example embodiments described herein may be embodied as a method, system, or computer program product. Accordingly, the various example embodiments may take the form of, for example, an entirely software embodiment (including firmware, resident software, micro-code, etc.) or, as another example, an embodiment combining software and hardware aspects that may all generally be referred to herein as a "module" or "system." Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++ or the like. However, the computer program code for carrying out operations of various example embodiments may also be written in conventional procedural programming languages, such as the "C" programming language or similar programming languages. The actual programming language selected is a matter of design choice and, as will be appreciated by those skilled in the art, any suitable programming language can be utilized.

Various example embodiments are described below with reference to flowchart illustration(s) and/or block diagrams of methods, apparatus (systems) and computer program products according to embodiments of the invention. Those skilled in the art will understand that various blocks of the flowchart illustration(s) and/or block diagrams, and combinations of blocks in the flowchart illustration(s) and/or block diagrams, can be implemented by computer program instructions. These computer program instructions may be provided to a processor of a general purpose computer, special purpose computer, or other programmable data processing apparatus to produce a machine, such that the instructions, which executed via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

Reference is now made to FIG. 1 which shows a block diagram of an example surveillance system 100 within which methods in accordance with example embodiments can be carried out. Included within the illustrated surveillance system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems [not shown]. The display controller subsystem 124 interacts with display 126 and it renders graphics and/or text upon the display 126.

Still with reference to the computer terminal 104 of the surveillance system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side video review application 144, and other applications 152, or parts thereof, may be temporarily loaded into a volatile store such as the RAM 116. The processor 112, in addition to its operating system functions, can enable execution of the various software applications on the computer terminal 104.

Figure 2:
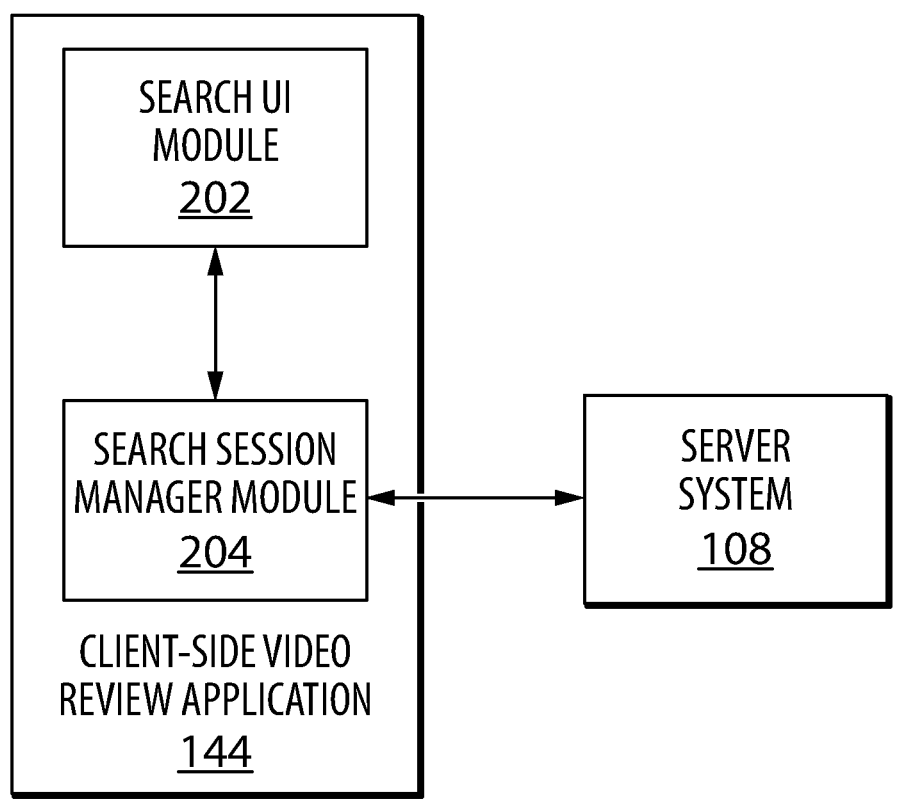
FIG. 2 shows a block diagram of a client-side video review application, in accordance with first example embodiments, that can be provided within the example surveillance system shown in FIG. 1.

More details of the video review application 144 are shown in the block diagram of FIG. 2. The video review application 144 can be run on the computer terminal 104 and includes a search User Interface (UI) module 202 for cooperation with a search session manager module 204 in order to enable a computer terminal user to carry out actions related to providing input and, more specifically, input to facilitate identifying same individuals or objects appearing in a plurality of different video recordings. In such circumstances, the user of the computer terminal 104 is provided with a user interface generated on the display 126 through which the user inputs and receives information in relation the video recordings.

The video review application 144 also includes the search session manager module 204 mentioned above. The search session manager module 204 provides a communications interface between the search UI module 202 and a query manager module 164 (FIG. 1) of the server system 108. In at least some examples, the search session manager module 204 communicates with the query manager module 164 through the use of Remote Procedure Calls (RPCs).

Besides the query manager module 164, the server system 108 includes several software components for carrying out other functions of the server system 108. For example, the server system 108 includes a media server module 168. The media server module 168 handles client requests related to storage and retrieval of video taken by video cameras 169 in the surveillance system 100. The server system 108 also includes an analytics engine module 172. The analytics engine module 172 can, in some examples, be any suitable one of known commercially available software that carry out mathematical calculations (and other operations) to attempt computerized matching of same individuals or objects as between different portions of video recordings (or as between any reference image and video compared to the reference image). For example, the analytics engine module 172 can, in one specific example, be a software component of the Avigilon Control Center™ server software sold by Avigilon Corporation. In another example, the analytics engine module 172 can be a software component of the Qognify Suspect Search™ product sold by Qognify UK Ltd. In some examples the analytics engine module 172 can uses the descriptive characteristics of the person's or object's appearance. Examples of these characteristics include the person's or object's shape, size, textures and color.

The server system 108 also includes a number of other software components 176. These other software components will vary depending on the requirements of the server system 108 within the overall system. As just one example, the other software components 176 might include special test and debugging software, or software to facilitate version updating of modules within the server system 108. The server system 108 also includes one or more data stores 190. In some examples, the data store 190 comprises one or more databases 191 which facilitate the organized storing of recorded video.

Regarding the video cameras 169, each of these includes a camera module 198. In some examples, the camera module 198 includes one or more specialized chips to facilitate processing and encoding of video before it is even received by the server system 108. For instance, the specialized chip may be a System-on-Chip (SoC) solution including both an encoder and a Central Processing Unit (CPU). These permit the camera module 198 to carry out the processing and encoding functions. Also, in some examples, part of the processing functions of the camera module 198 includes creating metadata for recorded video. For instance, metadata may be generated relating to one or more foreground areas that the camera module 198 has detected, and the metadata may define the location and reference coordinates of the foreground visual object within the image frame. For example, the location metadata may be further used to generate a bounding box, typically rectangular in shape, outlining the detected foreground visual object. The image within the bounding box may be extracted for inclusion in metadata. The extracted image may alternately be smaller then what was in the bounding box or may be larger then what was in the bounding box. The size of the image being extracted can also be close to, but outside of, the actual boundaries of a detected object.

In some examples, the camera module 198 includes a number of submodules for video analytics such as, for instance, an object detection submodule, an instantaneous object classification submodule, a temporal object classification submodule and an object tracking submodule. Regarding the object detection submodule, such a submodule can be provided for detecting objects appearing in the field of view of the camera 169. The object detection submodule may employ any of various object detection methods understood by those skilled in the art such as, for example, motion detection and/or blob detection.

Regarding the object tracking submodule that may form part of the camera module 198, this may be operatively coupled to both the object detection submodule and the temporal object classification submodule. The object tracking submodule would be included for the purpose of temporally associating instances of an object detected by the object detection submodule. The object tracking submodule may also generate metadata corresponding to visual objects it tracks.

Regarding the instantaneous object classification submodule that may form part of the camera module 198, this may be operatively coupled to the object detection submodule and employed to determine a visual objects type (such as, for example, human, vehicle or animal) based upon a single instance of the object. The input to the instantaneous object classification submodule may optionally be a sub-region of an image in which the visual object of interest is located rather than the entire image frame.

Regarding the temporal object classification submodule that may form part of the camera module 198, this may be operatively coupled to the instantaneous object classification submodule and employed to maintain class information of an object over a period of time. The temporal object classification submodule may average the instantaneous class information of an object provided by the instantaneous classification submodule over a period of time during the lifetime of the object. In other words, the temporal object classification submodule may determine a type of an object based on its appearance in multiple frames. For example, gait analysis of the way a person walks can be useful to classify a person, or analysis of the legs of a person can be useful to classify a bicycler. The temporal object classification submodule may combine information regarding the trajectory of an object (e.g. whether the trajectory is smooth or chaotic, whether the object is moving or motionless) and confidence of the classifications made by the instantaneous object classification submodule averaged over multiple frames. For example, determined classification confidence values may be adjusted based on the smoothness of trajectory of the object. The temporal object classification submodule may assign an object to an unknown class until the visual object is classified by the instantaneous object classification submodule subsequent to a sufficient number of times and a predetermined number of statistics having been gathered. In classifying an object, the temporal object classification submodule may also take into account how long the object has been in the field of view. The temporal object classification submodule may make a final determination about the class of an object based on the information described above. The temporal object classification submodule may also use a hysteresis approach for changing the class of an object. More specifically, a threshold may be set for transitioning the classification of an object from unknown to a definite class, and that threshold may be larger than a threshold for the opposite transition (for example, from a human to unknown). The temporal object classification submodule may aggregate the classifications made by the instantaneous object classification submodule.

In some examples, the camera module 198 is able to detect humans and extract images of humans with respective bounding boxes outlining the human objects for inclusion in metadata which along with the associated video may transmitted to the server system 108. At the system 108, the media server module 168 can process extracted images and generate signatures (e.g. feature vectors) to represent objects. In computer vision, a feature descriptor is generally known as an algorithm that takes an image and outputs feature descriptions or feature vectors. Feature descriptors encode information, i.e. an image, into a series of numbers to act as a numerical "fingerprint" that can be used to differentiate one feature from another. Ideally this information is invariant under image transformation so that the features may be found again in another image of the same object. Examples of feature descriptor algorithms are SIFT (Scale-invariant feature transform), HOG (histogram of oriented gradients), and SURF (Speeded Up Robust Features).

In accordance with at least some examples, a feature vector is an n-dimensional vector of numerical features (numbers) that represent an image of an object processable by computers. By comparing the feature vector of a first image of one object with the feature vector of a second image, a computer implementable process may determine whether the first image and the second image are images of the same object.

Similarity calculation can be just an extension of the above. Specifically, by calculating the Euclidean distance between two feature vectors of two images captured by one or more of the cameras 169, a computer implementable process can determine a similarity score to indicate how similar the two images may be.

In accordance with at least some examples, storage of feature vectors within the surveillance system 100 is contemplated. For instance, feature vectors may are indexed and stored in the database 191 with respective video. The feature vectors may also be associated with reference coordinates to where extracted images of respective objects are located in respective video. Storing may include storing video with, for example, time stamps, camera identifications, metadata with the feature vectors and reference coordinates, etc.

Figure 3:
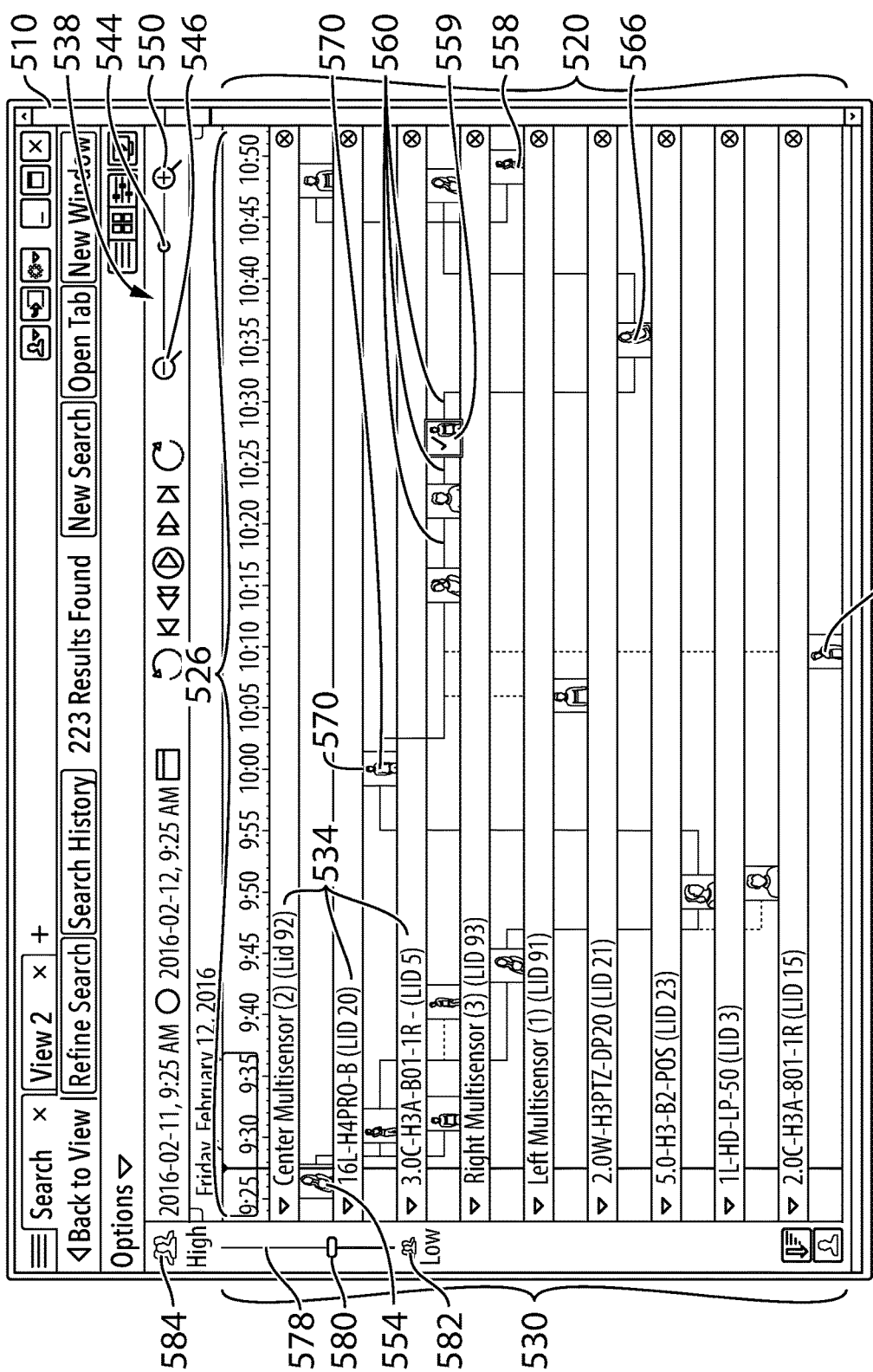
FIG. 3 illustrates an example user interface page, for the client-side video review application of FIG. 2, plotting thumbnails representative of portions of video recordings, the user interface page being configured for interaction therewith for identification of same individuals or objects in video recordings.

Reference will now be made to FIG. 3 which is a screen shot of an example user interface page that can be interacted with for identifying same individuals or objects in video recordings in accordance with some example embodiments. In at least one example, the video review application 144 (FIG. 1) generates user interface page 510 on the display 126 through which requests will be inputted for processing by the query manager module 164 on the server system 108.

Within the user interface page 510 is a two dimensional graph 520. The two dimensional graph 520 includes date and time along x-axis 526. In the illustrated example, each five minute interval is labelled starting at 9:25 AM at the far left of the x-axis 526 and ending at 10:50 AM at the far right of the x-axis 526. The interval of time between the two ends of the x-axis 526 can be increased or decreased by use of the slider tool 538. In particular, a moveable knob 544 can be moved between a left end and a right end of the slider tool 538. The left end of the slider tool 538 corresponds to setting the interval of time between the two ends of the x-axis 526 to a maximum (as indicated by the "minus" magnifying glass symbol 546). The right end of the slider tool 538 corresponds to setting the interval of time between the two ends of the x-axis 526 to a minimum (as indicated by the "plus" magnifying glass symbol 550).

The two dimensional graph 520 also includes, along a y-axis 530 of the graph 520, a listing of a plurality of camera identifications 534 of video cameras with respect to which a respective plurality of video recordings of the video cameras are available for viewing. Each one of the plurality of camera identifications 534 corresponds to a respective one of the plurality of video cameras 169 (FIG. 1) that is located in a unique known physical location with respect to all locations of the plurality of video cameras 169 of the surveillance system 100.

On the two dimensional graph 520 are plotted n image thumbnails, where n is an integer greater than two. The n image thumbnails are visually representative of certain portions of the video recordings (explained in more detail subsequently). A first of the n thumbnails, thumbnail 554, is shown earliest in time along the x-axis which, in this example, is at approximately 9:25 AM on Friday, Feb. 12, 2016. A last (or nth) thumbnail, thumbnail 558, is shown latest in time along the x-axis which, in this example, is at approximately 10:50 AM on Friday, Feb. 12, 2016.

Between the thumbnail 554 and the thumbnail 558 are various intervening thumbnails (fifteen intervening thumbnails in this example; however, in other examples, the number of intervening thumbnails can be, for instance, significantly larger than fifteen or, in yet other examples, significantly fewer than fifteen such as, for instance, as few as one or none). Also, it is noted that thumbnail 559 has a check mark in it and a box around it. This is to indicate that the thumbnail 559 is the reference image. The reference image is the image with respect to which all other relevant images are compared against to determine a likelihood of a match.

Lines 560 each connect one of the thumbnails with another thumbnail that is proximate to the other thumbnail in time (usually the most proximate one). Some of the lines 560 are fully solid. For example, the line between the thumbnail 559 and thumbnail 566 is fully solid. Others of the lines 560 are at least partly dotted. For example, the line between the thumbnail 570 and thumbnail 574 is partly dotted. In the illustrated example, the fully solid line means that the thumbnails connected at both ends of the line are both associated with respective portions of video recordings that are above a first threshold for likelihood of appearance of an individual or object having been identified as being of interest. By contrast, the partly dotted line means that the thumbnail connected at the later-in-time end of the line is associated with a respective portion of a video recording that is below the first threshold for likelihood of appearance of an individual or object having been identified as being of interest, but still above a second lower threshold as set by slider tool 578.

Figure 4:
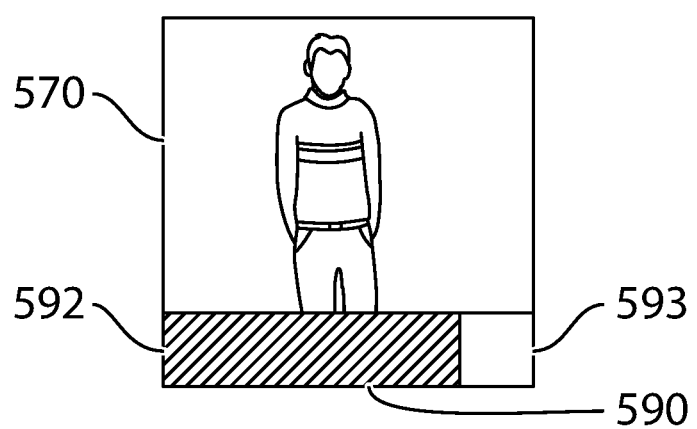
FIG. 4 illustrates, in more detail, one of the thumbnails shown in FIG. 3.
Figure 5:
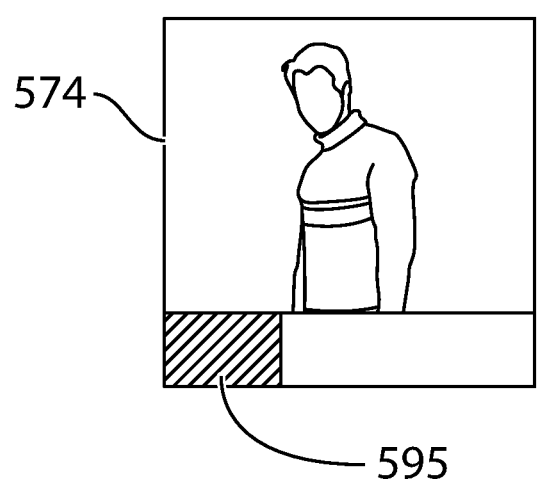
FIG. 5 illustrates, in more detail, another one of the thumbnails shown in FIG. 3.

As mentioned above, the slider tool 578 allows a person interacting with the user interface page 510 to set a filtering threshold as to which of the thumbnails are permitted to appear on the graph 520. In this example, a high level of filtering means that only those thumbnails corresponding to a portion of a video recording where there is a fairly high likelihood of appearance of the individual or object of interest are permitted to appear on the graph 520. By contrast, a low level of filtering means that it will be expected that more thumbnails will appear on the graph 520, including even those thumbnails corresponding to a portion of a video recording where there is a fairly low likelihood of appearance of the individual or object of interest. Moveable knob 580 can be moved between an upper end and a lower end of the slider tool 578. The lower end of the slider tool 578 corresponds to setting the filtering threshold to a minimum (as indicated by the word "Low" on symbol 582). The upper end of the slider tool 578 corresponds to setting the filtering threshold to a maximum (as indicated by the word "High" on symbol 584). Also, it is noted that, in the illustrated example, each thumbnail includes a visual indication of the likelihood of appearance of the individual or object of interest. Specifically, there is an indication bar at the bottom of each thumbnail. With reference to FIG. 4, indication bar 590 extends from a left side 592 of the thumbnail 570 towards a right side 593 of the thumbnail. The wide indication bar 590 indicates that the thumbnail 570 corresponds to a portion of a video recording where there is a higher likelihood of appearance of the individual or object of interest as compared to a portion of another video recording given a thumbnail having a comparatively narrow indication bar. For example, as shown in FIG. 5, the thumbnail 574 has a narrower indication bar 595 than the indication bar 590 of the thumbnail 570.

Figure 6:
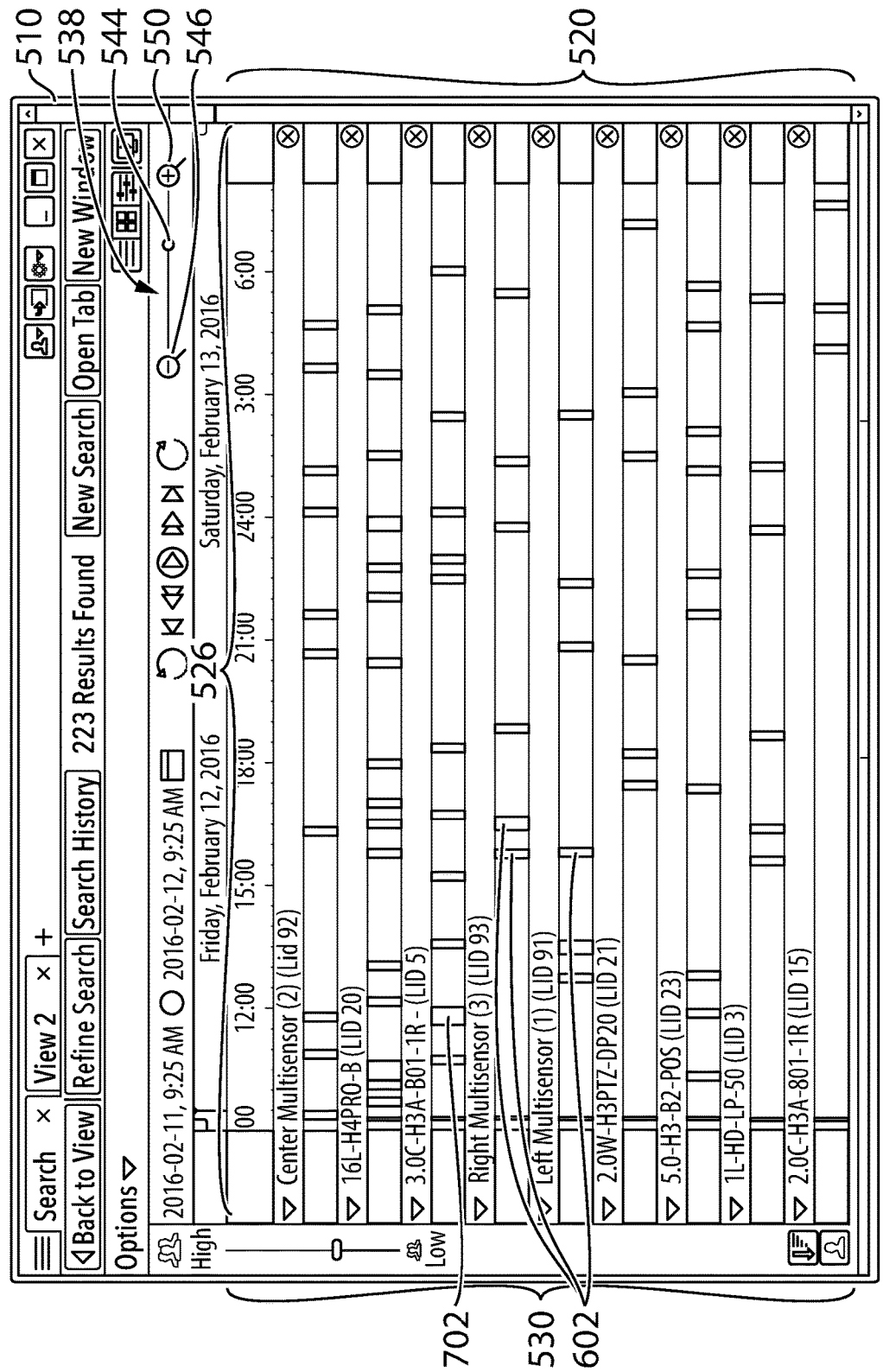
FIG. 6 illustrates another example user interface page, for the client-side video review application of FIG. 2, plotting thumbnails representative of portions of video recordings, the illustrated thumbnails being smaller in size than the thumbnails of FIG. 3.

Reference will now be made to FIG. 6. As mentioned before, the interval of time between the two ends of the x-axis 526 can be increased or decreased by use of the slider tool 538. FIG. 6 illustrates the impact on the graph 520 when, relative to what is shown in FIG. 3, the moveable knob 544 is moved closer to the "minus" magnifying glass 546 (i.e. the interval of time between the two ends of the x-axis 526 is increased). As one example of the impact, thumbnails 602 shown in FIG. 6 are quite smaller in size as compared to the thumbnails in FIG. 3 (e.g. the thumbnails 559, 566, etc.). This is to be expected because, for example, there are many more thumbnails to plot in this version of the graph as compared to the previous version of the graph illustrated in FIG. 3 (i.e. seventy four thumbnails versus seventeen thumbnails). Because of the reduction in size, there is no longer a representative image provided on the thumbnail. Instead these smaller thumbnails include only bar-type indications.

As the bar-type indications of the thumbnails 602 are not the same as those of the thumbnails 560 shown FIG. 3, the differences are now presently explained. Firstly, it will be understood that, a portion of a video recording to which a thumbnail corresponds is not necessarily of a minute or tiny duration and could be, for example, several minutes long. Thus, it is possible that a portion of a video recording to which a thumbnail corresponds can be further sub-divided into yet further portions, and likelihood of appearance of the individual or object of interest may vary as between each of these further portions. For example, say that a complete portion of a video recording is four minutes long. It could be that a first minute of the four minutes of video recording has an associated first likelihood of appearance of the individual or object of interest. Next a second minute of the four minutes of video recording has an associated second likelihood of appearance of the individual or object of interest which is greater than the first likelihood of appearance. Finally, a last two minutes of the four minutes of the video recording has an associated third likelihood of appearance of the individual or object of interest which is greater than the second likelihood of appearance.

Figure 7:
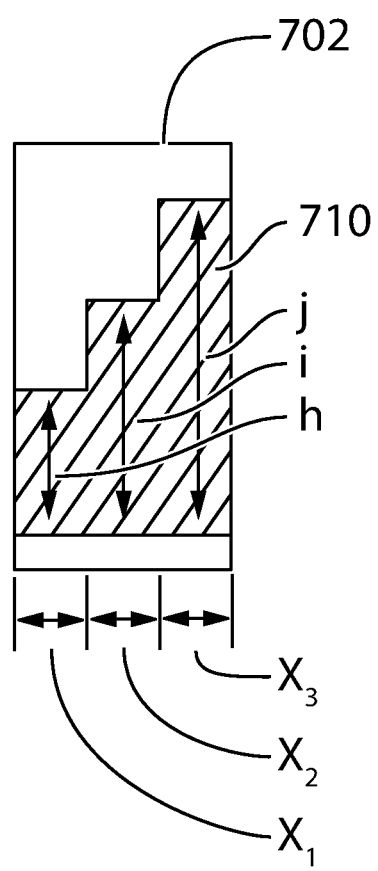
FIG. 7, in more detail, one of the thumbnails shown in FIG. 6.

In order to present these differences in likelihoods of appearance to a person interacting with the user interface page 510, the thumbnails themselves can provide a miniature graphical representation of likelihood of appearance as a function of time. With reference now to FIGS. 6 and 7, thumbnail 702 is one such thumbnail. During a first time period $x_1$, the first likelihood of appearance is represented by a first height h of bar graph 710. During a second time period $x_2$, the second likelihood of appearance is represented by a second height i of bar graph 710. It will be noted that the height i is greater than the height h, indicating that likelihood of appearance is greater during the second time period than during the first time period. During a third time period $x_3$, the third likelihood of appearance is represented by a third height j of bar graph 710. It will be noted that the height j is greater than the height i, indicating that likelihood of appearance is greater during the third time period than during the second time period.

Figure 8:
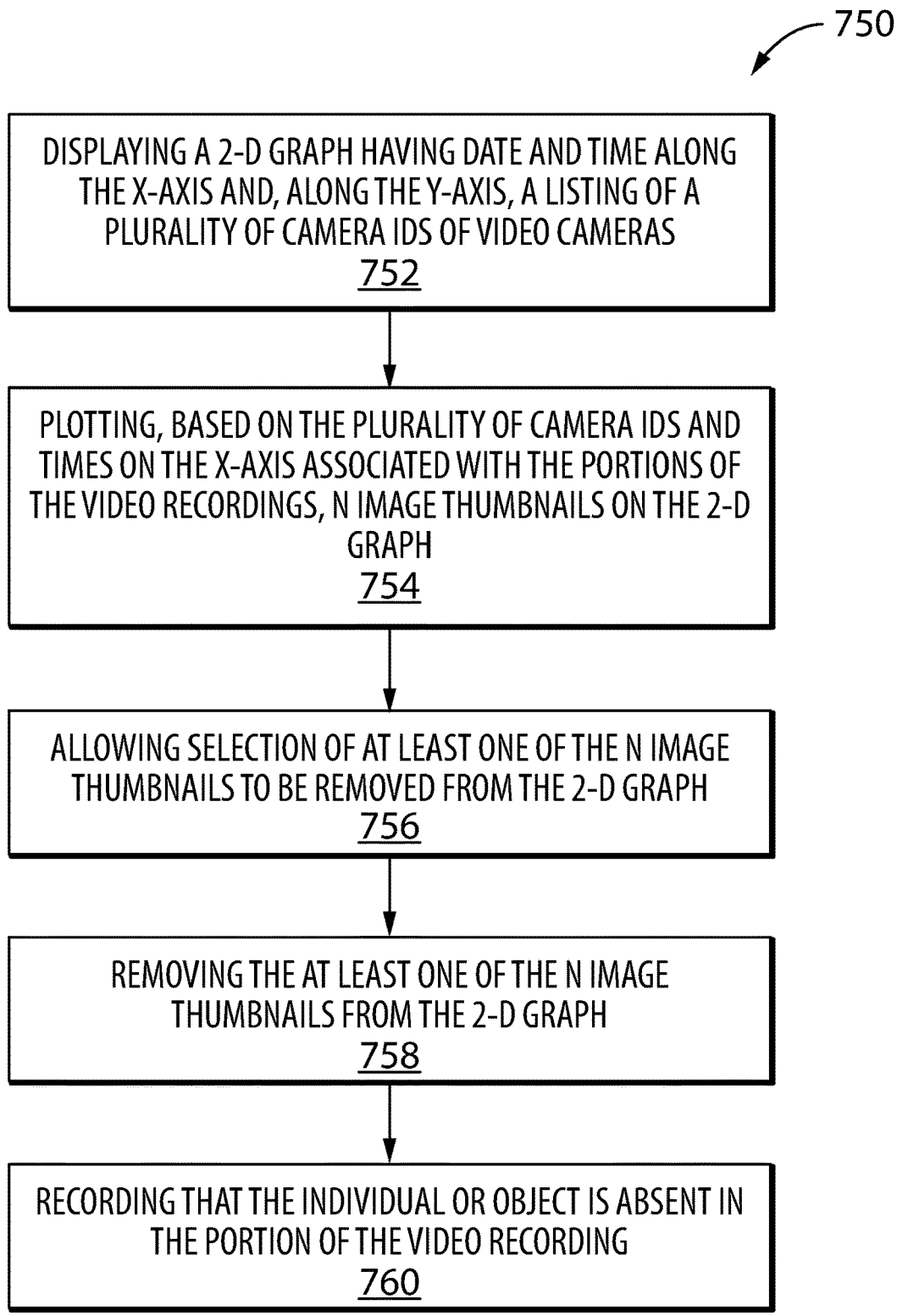
FIG. 8 is a flow chart illustrating a first user interface-driven method in accordance with some example embodiments.

Reference will now be made to FIG. 8 which is a flow chart illustrating a method 750 in accordance with example embodiments. As a first action (752) in the illustrated method 750, a two dimensional graph is displayed, where the two dimensional graph has date and time along the x-axis and, along the y-axis, a listing of a plurality of camera IDs of video camera. The two dimensional graph can be displayed within, for example, a user interface page such as, for instance, the user interface page 510 illustrated in FIGS. 3 and 6.

Next the method 750 includes plotting (754) n image thumbnails on the two dimensional graph, where the plotting is based on the plurality of camera IDs and times on the x-axis associated with the portions of the video recordings. Regarding the above action 754, more details concerning this have been shown and described in FIGS. 3 and 6 and the associated description for those figures.

Next the method 750 includes allowing selection (756) of at least one of the n image thumbnails to be removed from the two dimensional graph. For example, take for instance the thumbnail 574 shown in FIGS. 3 and 5. A user of the computer terminal 104 may determine that the person shown in the portion of the video recording associated with the thumbnail 574 is not the individual of interest. Accordingly, the user may select the thumbnail 574 for removal from the two dimensional graph. The specific user interface actions for carrying this out may take any one of a variety of different forms understood by those skilled in the art. For example, by moving a cursor over the thumbnail 574 an "x" symbol could appear (or alternatively the "x" could be permanently visible) and the user could then click on the "x" to provide input into the client-side video review application (the input being that the thumbnail 574 is selected for removal from the two dimensional graph). As an alternative example, the user could be permitted to click on one or more thumbnails, these one or more thumbnails would then become highlighted, and then a final icon (for instance, a trash can icon within the user interface page 510) could be selected to make the one or more thumbnails collectively removed.

Next the method 750 includes removing (758) the at least one of the n image thumbnails from the two dimensional graph. For example, the thumbnail 574 could be removed from the two dimensional graph shown in FIG. 3 subsequent to the action 756.

Finally the method 750 includes recording (760) that the individual or object is absent in the portion of the video recording corresponding to the removed thumbnail. The recording may be in the RAM 116 (FIG. 1) and/or the non-volatile storage 120 of the computer terminal 104. Contemporaneously (or at a later point in time) the database 191 of the storage 190 may record this change as well.

Figure 9:
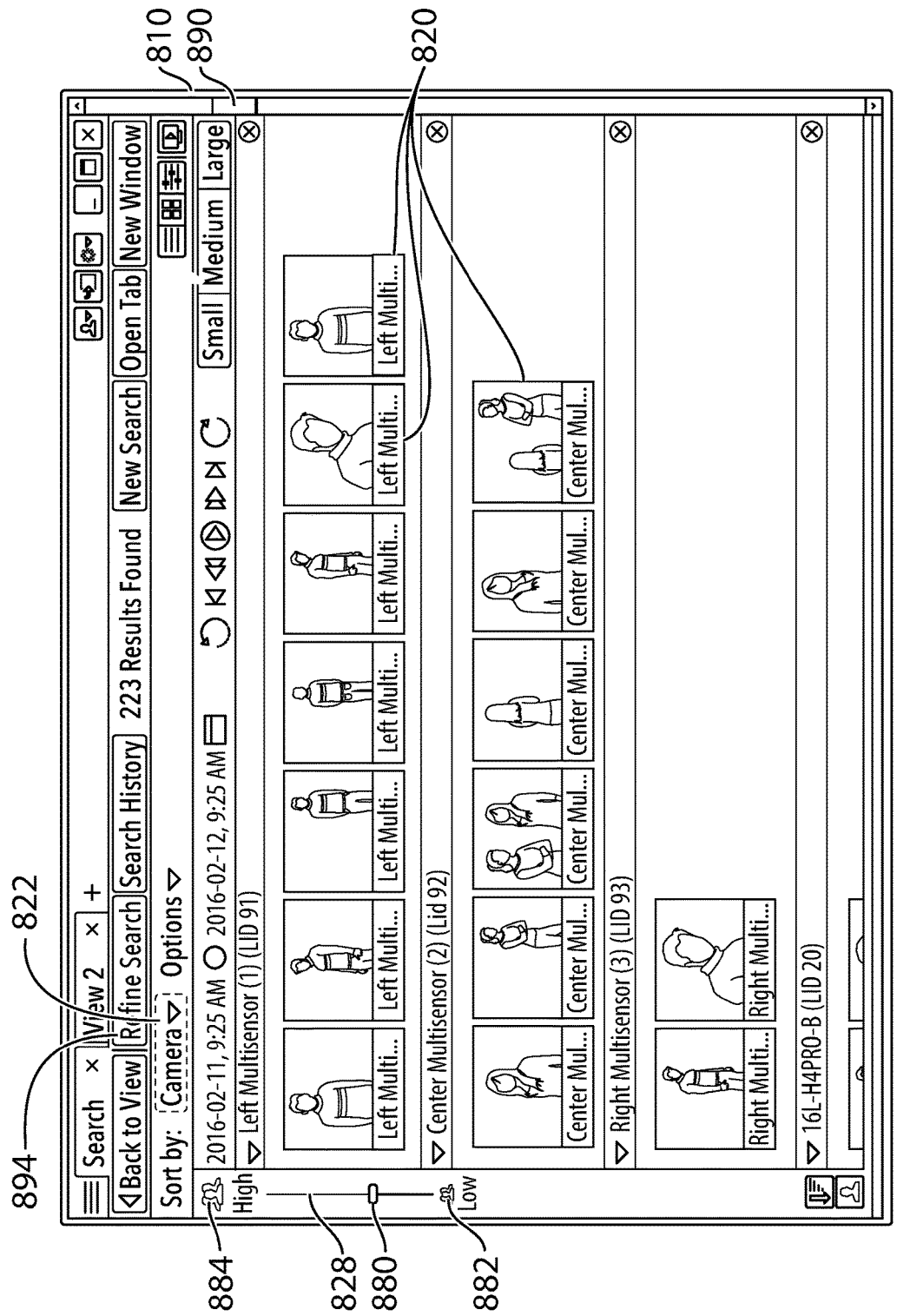
FIG. 9 illustrates another example user interface page, for the client-side video review application of FIG. 2, plotting thumbnails organized by the video cameras that took the portions of the video recordings corresponding to the illustrated thumbnails.

Reference with now be made to FIG. 9 which illustrates a screen shot of another example user interface page 810 that can be interacted with for identifying same individuals or objects in video recordings in accordance with some example embodiments. In at least one example, the video review application 144 (FIG. 1) generates the user interface page 810 on the display 126 through which requests will be inputted for processing by the query manager module 164 on the server system 108.

In the example user interface page 810, thumbnails 820 are organized according to which of the video cameras 169 (FIG. 1) that are identified as having taken the portions of the video recordings corresponding to the illustrated thumbnails 820. Thus, it will be seen that there are seven thumbnails available under camera "Left Multisensor (1)(LID 91)". There are six thumbnails available under camera "Center Multisensor (2)(LID 92)". There are two thumbnails available under camera "Right Multisensor (3)(LID 93)". Finally, there are two thumbnails available under camera "16L-H4PRO-B (LID 20)". Organization by some parameter other than specific video camera is possible. More specifically, the illustrated user interface page 810 includes a drop-down selector 822 which permits thumbnail organization by a different parameter (for example, by chronological age, as will be later herein described in relation to FIG. 11).

The thumbnails 820 in FIG. 9 are somewhat similar to those of FIG. 3; however, because they are larger in size, written information can be included at the bottom of them including percentage likelihood of appearance, name of the corresponding video camera and time stamp. In accordance with at least one example embodiment, single clicking on any of the thumbnails 820 will bring the user to a starting point in the portion of the video corresponding to that thumbnail. By contract, double clicking on any of the thumbnails 820 will bring the user to the exact point in the video as shown in the thumbnail image.

Slider tool 828 functions in a manner similar to the slider tool 578 previously discussed in connection with FIG. 3, and thus the slider tool 828 allows a person interacting with the user interface page 810 to set a filtering threshold as to which of the thumbnails 820 are permitted to appear on the user interface page 810. As in the previous example, a high level of filtering means that only those thumbnails corresponding to a portion of a video recording where there is a fairly high likelihood of appearance of the individual or object of interest are permitted to appear on the user interface page 810. By contrast, a low level of filtering means that it will be expected that there will be more thumbnails appearing on the user interface page 810, including even those thumbnails corresponding to a portion of a video recording where there is a fairly low likelihood of appearance of the individual or object of interest. Moveable knob 880 can be moved between an upper end and a lower end of the slider tool 828. The lower end of the slider tool 828 corresponds to setting the filtering threshold to a minimum (as indicated by the word "Low" on symbol 882). The upper end of the slider tool 828 corresponds to setting the filtering threshold to a maximum (as indicated by the word "High" on symbol 884). Also, it is noted that, in some examples, each of the thumbnails 820 can include a visual indication of the likelihood of appearance of the individual or object of interest. Specifically, there can be an indication bar in the bottom half of each thumbnail. This indication bar has already been explained in connection with FIGS. 4 and 5. Additionally, it is noted that, specifically for these larger thumbnails, a percentage likelihood of appearance (i.e. some amount between 1% and 100%) can be shown as superimposed on the indication bar.

In the user interface page 810 shown in FIG. 9, all the video cameras 169 are included (four cameras are shown in the screen area; however more are available just by scrolling down the user interface page 810 using the icon 890). In accordance with some examples, a computer terminal user can have control over which of the video cameras 169 are included on the user interface page 810. For example, by clicking "Refine Search" icon 894, the computer terminal user can cause a new interface window 910 to be provided as shown in FIG. 10.

The illustrated interface window 910 includes three window areas: a camera list area 912, a reference image area 914 and a date and time adjustor area 916. The camera list in the camera list area 912 is organized as a hierarchy of check boxes. At the highest level in the hierarchy is a check box 919 which corresponds to all video cameras located at "Chicago Site" (hereinafter this hierarchical level will be referred to as the site level). Putting a check in the check box 919 initially causes all of the cameras at the Chicago Site to become selected. Similarly unchecking the check box 919 will cause all of the cameras at the Chicago Site to become unselected. At the next level in the hierarchy are check boxes 920, 922, 924 and 926 which correspond to geographical areas at the Chicago Site (hereinafter this hierarchical level will be referred to as the geographical area level). In the illustrated example, the check box 920 corresponds to the geographical area of "North Side of Building", the check box 922 corresponds to the geographical area of "East Parking Lot", the check box 924 corresponds to the geographical area of "West Pipe Yard", and the check box 926 corresponds to the geographical area of "Manufacturing". Putting a check in the check box corresponding to a geographical area level initially causes all of the cameras organized under that specific geographical area level to become selected. So, for instance, if the check box 920 is checked, this will initially cause all of the check boxes 930, 932 and 934 associated with cameras "Left Multisensor (1)(LID 91)", "Center Multisensor (2)(LID 92)", and "Right Multisensor (3)(LID 93)" respectively to become checked (hereinafter the hierarchical level of individual video cameras will be referred to as the camera level). Similarly, unchecking a check box corresponding to a geographical area level will cause all of the cameras organized under that specific geographical area level to become unselected. So, for instance, if the check box 920 is unchecked, this will cause all of the check boxes 930, 932 and 934 associated with cameras "Left Multisensor (1)(LID 91)", "Center Multisensor (2)(LID 92)", and "Right Multisensor (3)(LID 93)" respectively to become unselected.

Figure 10:
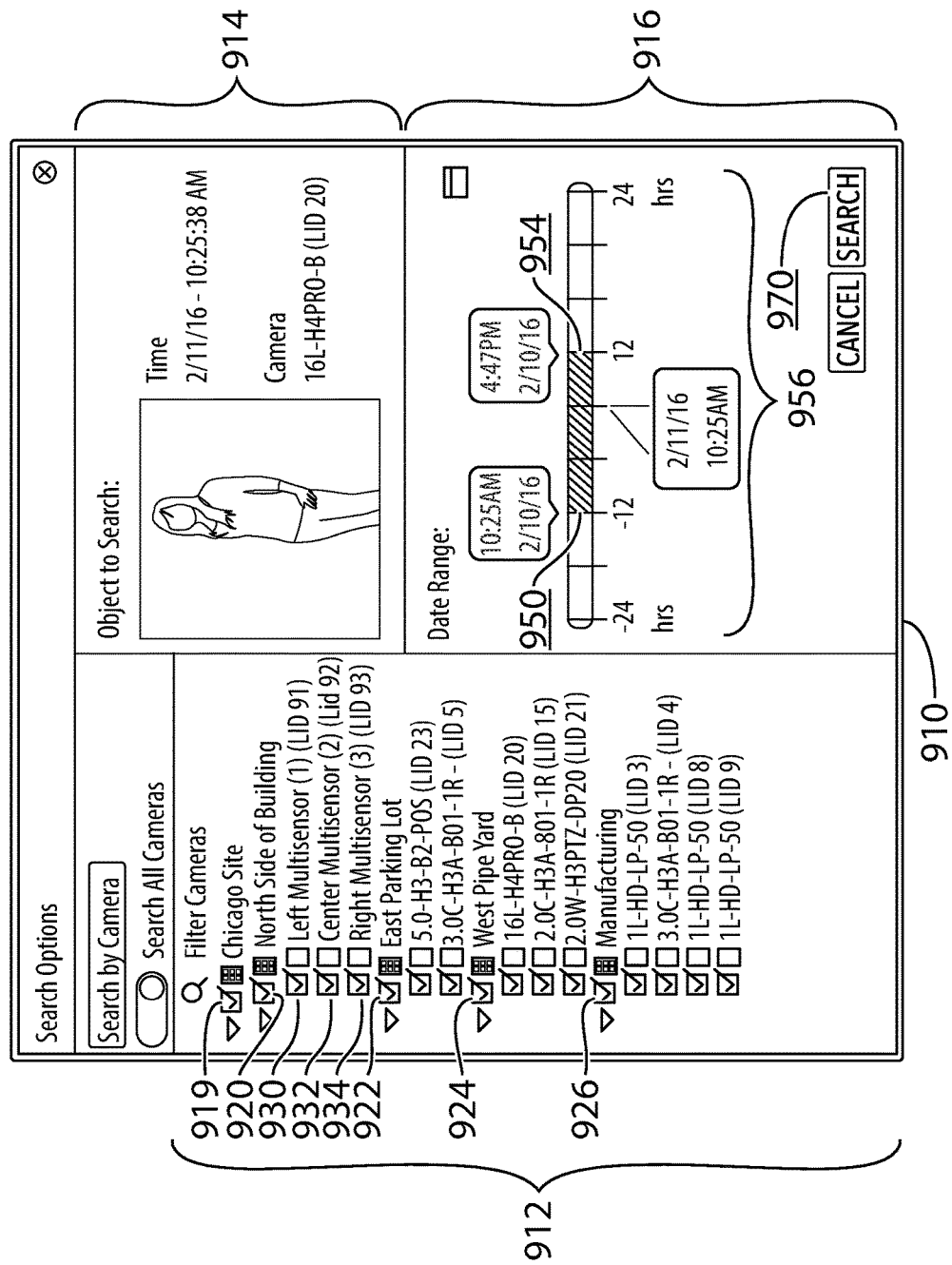
FIG. 10 illustrates an example user interface window for refining a search in accordance with example embodiments.

Still with reference to FIG. 10, the reference image area 914 is in the top, right region of the interface window 910. As mentioned before, the reference image is the image with respect to which all other relevant images are compared against to determine a likelihood of a match. Also within the illustrated interface window 910, below the reference image area 914, is the date and time adjustor area 916. The date and time adjustor area 916 provides the computer terminal user the ability to change the date and time range of the search. In particular, either left end 950 or right end 954 of the dark colored bar can be moved relative to the entire length of time/date line 956. Moving either the left end 950 to the left or the right end 954 to the right increases the total time/date range of the search. Similarly moving either the left end 950 to the right or the right end 954 to the left decreases the total time/date range of the search. In accordance with at least one example embodiment, the right end of the time/date line 956 can be as recent in time as a few minutes before the current time at which the client-side video review application is being run. Those skilled in the art will appreciate that adjusting a time/date line to include very recent video recordings is not limited to the example interface window 910, but is indeed can be applicable to other example embodiments herein described as well.

Once all desired changes have been made within the interface window 910, the search can be updated to reflect the parameters that have been changed by the computer terminal user. In the illustrated example the computer terminal user can initiate this by clicking on "SEARCH" icon 970. The video review application 144 then returns the computer terminal user to an updated version of the user interface page 810.

On another note regarding the interface window 910 illustrated in FIG. 10, it will be understood that its application is not limited to the example embodiment of FIG. 9. The interface window 910 is also suitable for other example embodiments such as, for instance, the example embodiment of FIG. 20 that will be later herein described.

Figure 11:
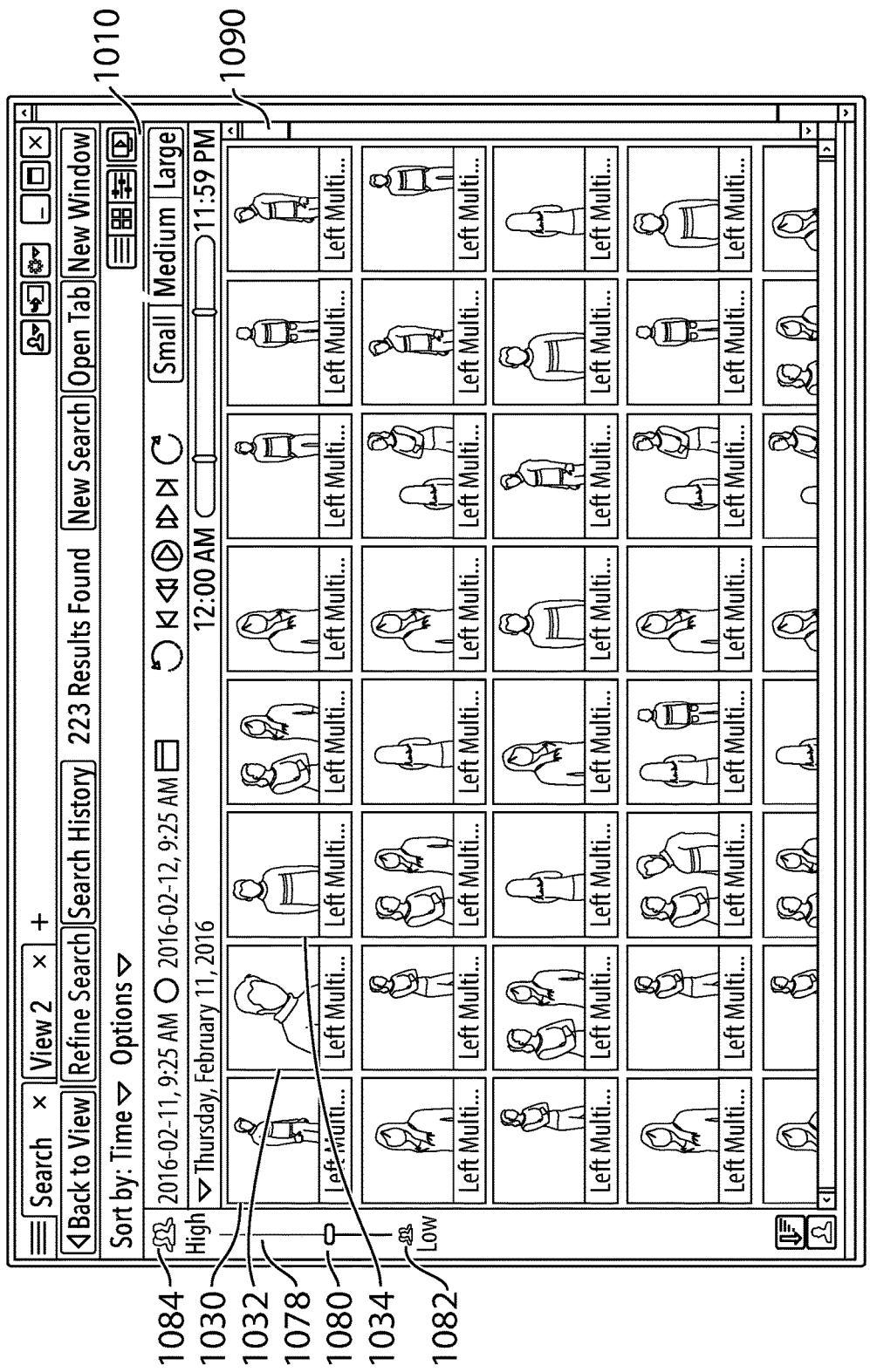
FIG. 11 illustrates another example user interface page, for the client-side video review application of FIG. 2, plotting thumbnails in order of chronological age with respect to the portions of the video recordings corresponding to the illustrated thumbnails.

Reference will now be made to FIG. 11 which illustrates a screen shot of another example user interface page 1010 that can be interacted with for identifying same individuals or objects in video recordings in accordance with some example embodiments. In at least one example, the video review application 144 (FIG. 1) generates the user interface page 1010 on the display 126 through which requests will be inputted for processing by the query manager module 164 on the server system 108.

The user interface page 1010 is similar to the user interface page 810 shown in FIG. 9; however organization of thumbnails is by chronological age rather than by specific video cameras. Thus, it will be seen that upper and left most thumbnail 1030 corresponds to a portion of a video recording earliest in time, beginning at around 9:25 AM. Next in time is a portion of a video recording beginning at around 9:41 AM (thumbnail 1032). After that is a portion of a video recording beginning at around 10:13 AM (thumbnail 1034). Thus, the organization followed is ordering thumbnails from left to right for each row, starting with an uppermost row, then proceeding down to next rows following the same left to right ordering or, by way of analogy, the organization is similar to how words would be ordered on pages of any sort of English language book or publication. The thumbnails in FIG. 11 follow the same formatting, style and content as the thumbnails 820 of FIG. 9. For example, like the thumbnails in FIG. 9 the thumbnails in FIG. 11 can have written information included at the bottom of them including, for example, percentage likelihood of appearance, name of the corresponding video camera and time stamp. In the illustrated example, many thumbnails are shown in the screen area; however even more thumbnails are available just by scrolling down the user interface page 1010 using the icon 1090.

Slider tool 1078 functions in a manner similar to the slider tool 578 previously discussed in connection with FIG. 3, and thus the slider tool 1078 allows a person interacting with the user interface page 1010 to set a filtering threshold as to which of the illustrated thumbnails are permitted to appear on the user interface page 1010. As in the previous example, a high level of filtering means that only those thumbnails corresponding to a portion of a video recording where there is a fairly high likelihood of appearance of the individual or object of interest are permitted to appear on the user interface page 1010. By contrast, a low level of filtering means that it will be expected that there will be more thumbnails appearing on the user interface page 1010, including even those thumbnails corresponding to a portion of a video recording where there is a fairly low likelihood of appearance of the individual or object of interest. Moveable knob 1080 can be moved between an upper end and a lower end of the slider tool 1078. The lower end of the slider tool 1078 corresponds to setting the filtering threshold to a minimum (as indicated by the word "Low" on symbol 1082). The upper end of the slider tool 1078 corresponds to setting the filtering threshold to a maximum (as indicated by the word "High" on symbol 1084). Also, it is noted that, in some examples, each of the thumbnails can include a visual indication of the likelihood of appearance of the individual or object of interest. Specifically, there can be an indication bar in the bottom half of each thumbnail. This indication bar has already been explained in connection with FIGS. 4 and 5. Additionally, it is noted that, specifically for these larger thumbnails, a percentage likelihood of appearance (i.e. some amount between 1% and 100%) can be shown as superimposed on the indication bar.

Figure 12:
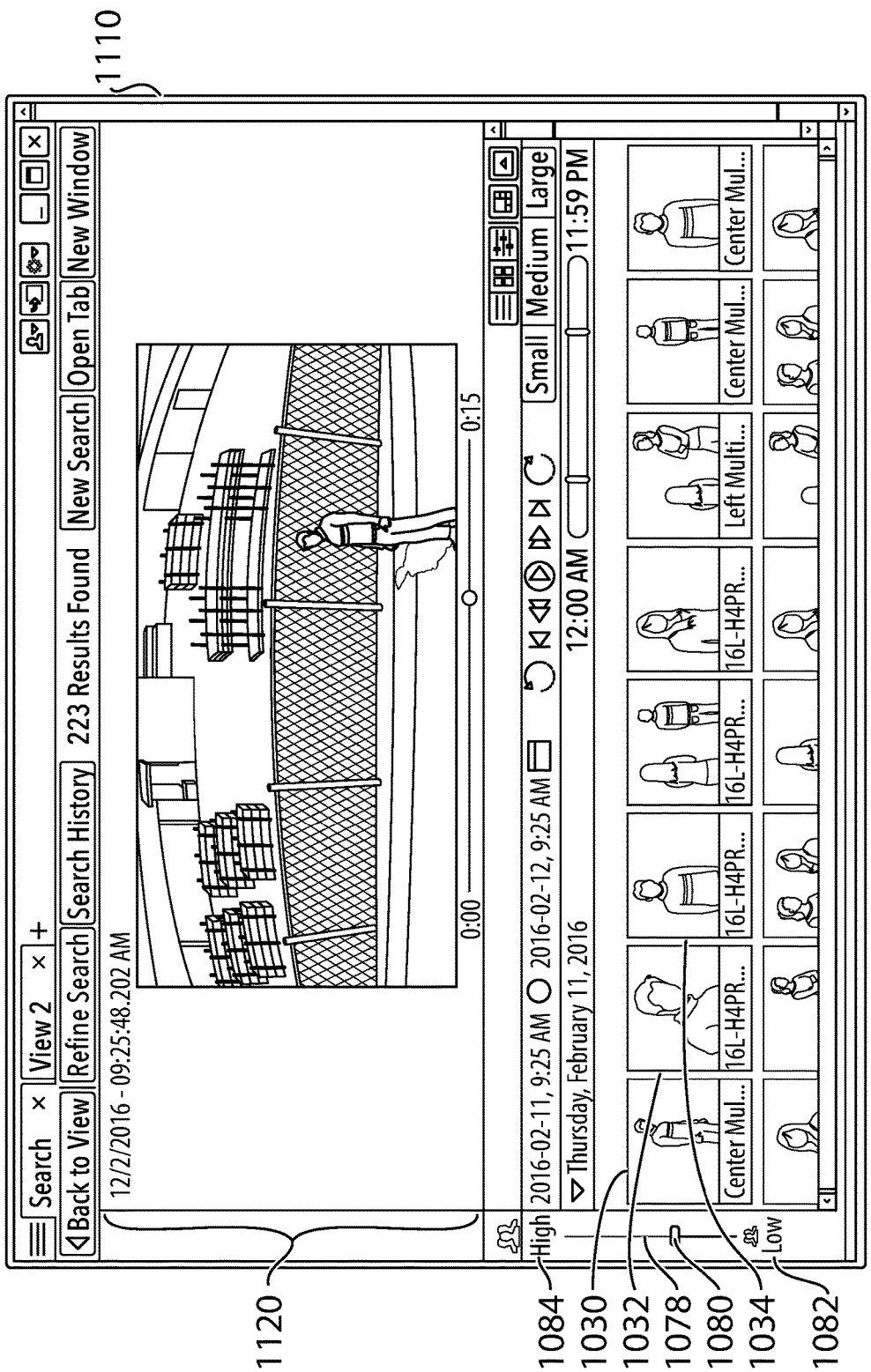
FIG. 12 illustrates an example user interface page similar to the user interface page of FIG. 11, but containing therein an example video player.

In some examples, the thumbnails can be clicked on by the computer terminal user to bring up a video player allowing the computer terminal user to watch the portion of the video recording corresponding to the selected thumbnail. For instance, with reference to FIGS. 11 and 12, the thumbnail 1030 can be clicked on by the computer terminal user (for example, as previously described, single clicking on the thumbnail 1030 may bring the user to a starting point in the portion of the video corresponding to that thumbnail, and double clicking on the thumbnail 1030 may bring the user to the exact point in the video as shown in the thumbnail image). The clicking action changes the user interface page 1010 into a new user interface page 1110 that is similar to the user interface page 1010 but includes video player 1120. The video player 1120 plays the portion of the video recording corresponding to the thumbnail 1030. In this manner the computer terminal user can watch the portion of the video recording and hopefully by watching this the computer terminal user can see or notice something that will allow a decision to be made as to whether or not the individual or object of interest actually appears in the portion of the video recording corresponding to the thumbnail 1030. It will be appreciated that the above-described user interface page transformation in respect of which a video player appears upon clicking of a thumbnail is not just limited to the example embodiments of FIGS. 11 and 12. It is equally applicable to other relevant example embodiments including, for example, those shown in FIGS. 3, 6 and 9.

Figure 13:
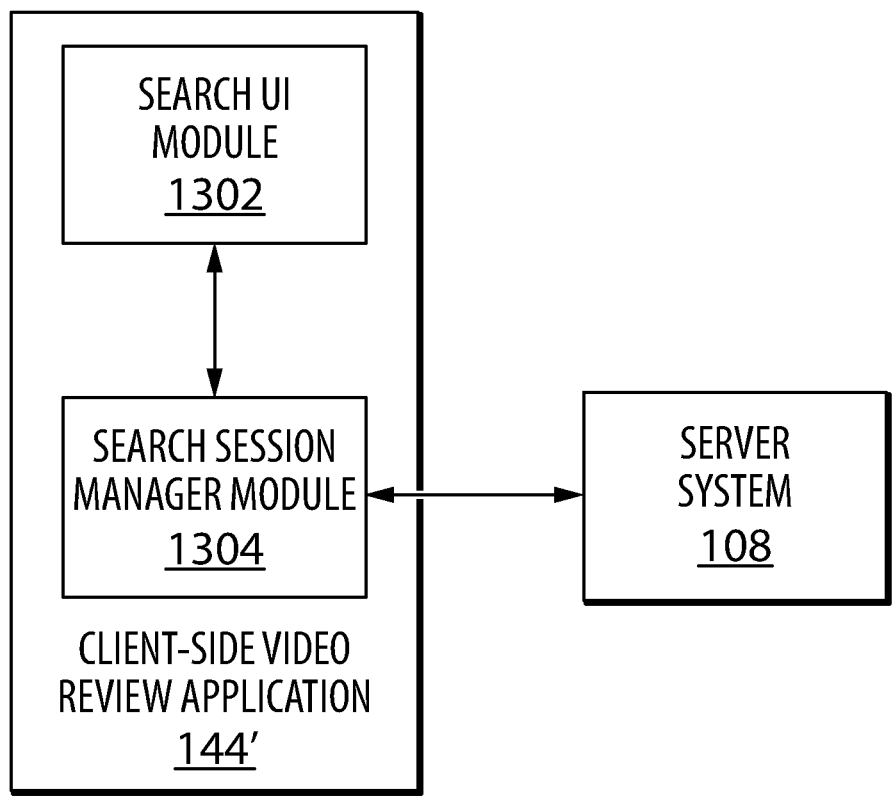
FIG. 13 shows a block diagram of a client-side video review application, in accordance with second alternative example embodiments, that can be provided within the example surveillance system shown in FIG. 1.

Reference will now be made to FIG. 13 which shows a block diagram of a client-side video review application 144' for the example surveillance system shown in FIG. 1. There are similarities between the video review application 144' and the video review application 144 described previously. For example, both video review applications relate to providing a UI to collect input for facilitating the identification of same individuals or objects appearing in a plurality of different video recordings. Further similarities will become apparent from the description which follows.

The video review application 144' can be run on the computer terminal 104 (FIG. 1) and includes a search UI module 1302 for cooperation with a search session manager module 1304 in order to enable a computer terminal user to carry out actions related to providing input and, more specifically, input to facilitate identifying same individuals or objects appearing in a plurality of different video recordings. In such circumstances, the user of the computer terminal 104 is provided with a user interface generated on the display 126 through which the user inputs and receives information in relation the video recordings.

The video review application 144' also includes the search session manager module 1304 mentioned above. The search session manager module 1304 provides a communications interface between the search UI module 1302 and a query manager module 164 (FIG. 1) of the server system 108. In at least some examples, the search session manager module 1304 communicates with the query manager module 164 through the use of Remote Procedure Calls (RPCs).

Figure 14:
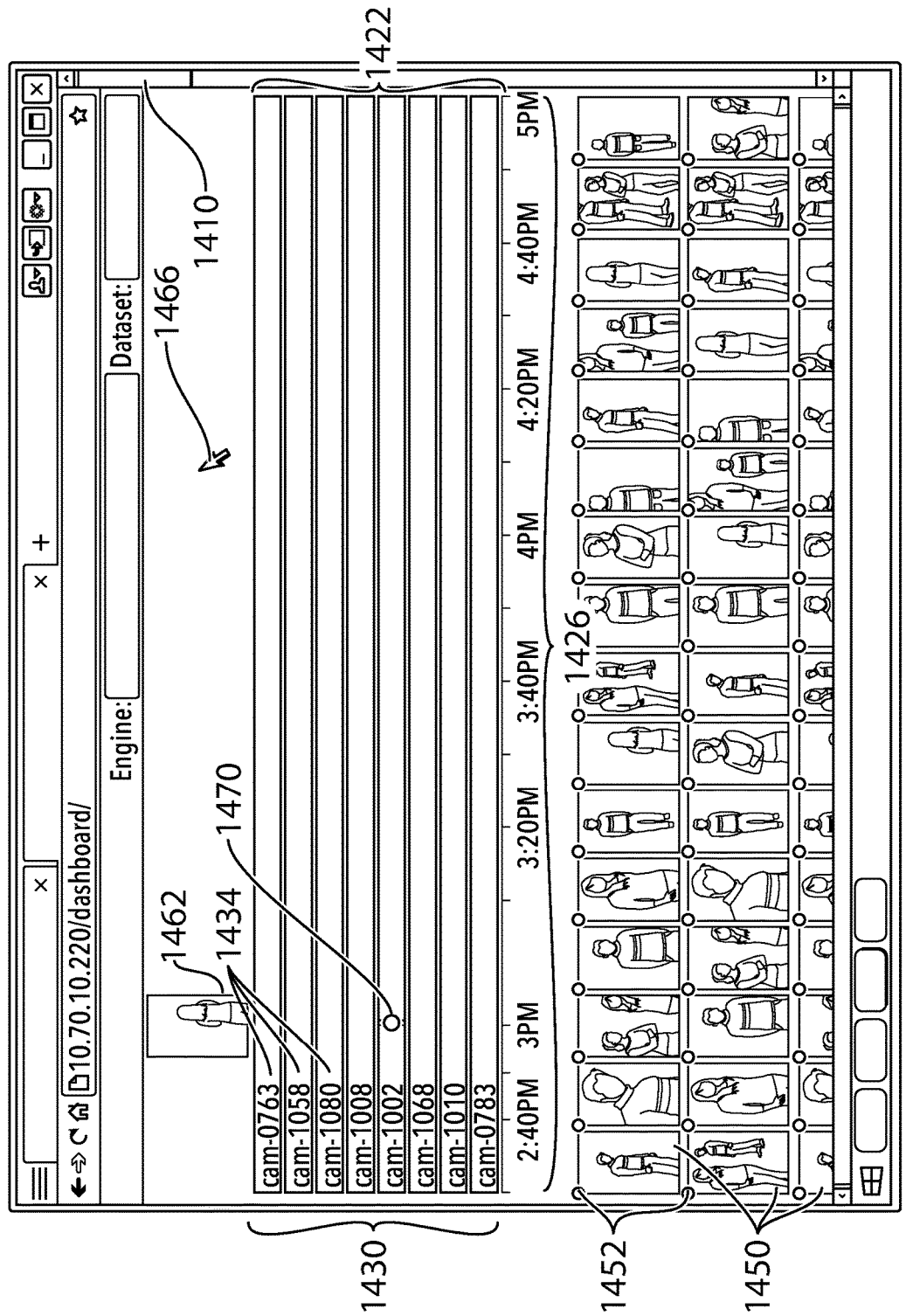
FIG. 14 illustrates an example user interface page, for the client-side video review application of FIG. 13, plotting thumbnails representative of portions of video recordings.

Reference will now be made to FIG. 14 which is a screen shot of an example user interface page 1410 that can be interacted with for identifying same individuals or objects in video recordings in accordance with some example embodiments. In at least one example, the video review application 144' (FIG. 13) generates the user interface page 1410 on the display 126 (FIG. 1) through which requests will be inputted for processing by the query manager module 164 on the server system 108.

Within the user interface page 1410 is a two dimensional graph 1422. The two dimensional graph 1422 includes date and time along x-axis 1426. In the illustrated example, each twenty minute interval is labelled starting at 2:40 PM near the far left of the x-axis 1426 and ending at 5:00 PM at the far right of the x-axis 1426. In at least some examples, the interval of time between the two ends of the x-axis 1426 can be increased or decreased. For instance, the user interface page 1410 might include a slider tool similar to the slider tool 538 described in connection with the user interface page 510 (FIG. 3). In at least one example, the slider tool can change the granularity of the time interval from anywhere between 1 minute to 30 minutes. Of course other granularity ranges are possible.

The two dimensional graph 1422 also includes, along a y-axis 1430 of the graph 1422, a listing of a plurality of camera identifications 1434 of video cameras with respect to which a respective plurality of video recordings of the video cameras are available for viewing. Each one of the plurality of camera identifications 1434 corresponds to a respective one of the plurality of video cameras 169 (FIG. 1) that is located in a unique known physical location with respect to all locations of the plurality of video cameras 169 of the surveillance system 100. The organization of the listing of the plurality of camera identifications 1434 may be such that it is in descending order (from top to bottom) based those camera identification having the most markers. Alternatively other forms of organization of the listing of the plurality of camera identifications 1434 are contemplated.

Underneath the two dimensional graph 1422 is a plurality of image thumbnails 1450 organized into columns. Each column is assigned an interval of time so, starting from the leftmost column, a first column is assigned the time interval of 2:30 PM to 2:39.59 PM. Then the next column is assigned the time interval of 2:40 PM to 2:49.59 PM, and so on. In this manner, one of the thumbnails should only appear in the first column if the associated portion of the video recording for that thumbnail falls within the time interval of 2:30 PM to 2:39.59 PM. Otherwise the thumbnail needs to go in whichever of the columns is the matching time interval. Also, those skilled in the art will appreciate that the above described organization into columns is not critical. For example, organization into rows would be a suitable alternative design choice.

It will be noted that in each of the thumbnail columns the thumbnails 1450 are organized in an order that is based on the likelihood of appearance of the individual or object having been identified as being of interest. This can be seen from an indicia provided on each of the thumbnails 1450. In the illustrated example, this indicia takes the form of a circle 1452 within which is displayed a percentage number (this detail of the indicia is too small to be illustrated in FIG. 14) corresponding to likelihood of appearance of an individual or object having been identified as being of interest. Taking the leftmost column as an example, the percentage number corresponding to the top thumbnail is 87%, the next thumbnail below that one is 84%, then the next thumbnail below that one is 81%, and so on.

Within the illustrated user interface page 1410 there is also a thumbnail 1462 positioned above the two dimensional graph 1422 and vertically aligned with a thumbnail column corresponding to the time interval of 3:00 PM to 3:09.59 PM. The thumbnail 1462 is different from the thumbnails below the graph 1422 in that a user of the computer terminal 104 (FIG. 1) provided, at some preceding moment, input that the girl in the thumbnail is the particular individual having been identified as being of interest (i.e. 100% likelihood of being a match). This was done, at the preceding moment, by moving cursor 1466 across the user interface page 1410 and clicking on one of the thumbnails below the graph 1422. Once then thumbnail is clicked on it moves up above the graph 1422 while still remaining vertically aligned with the thumbnail column it came from.

It will also be noted that the thumbnail 1462 has a corresponding marker 1470 on the graph 1422. In this illustrated example, the marker 1470 indicates that the girl of interest appears in a portion of a video recording taken by video camera "cam-1002" during the time interval of 3:00 PM to 3:09.59 PM.

Figure 15:
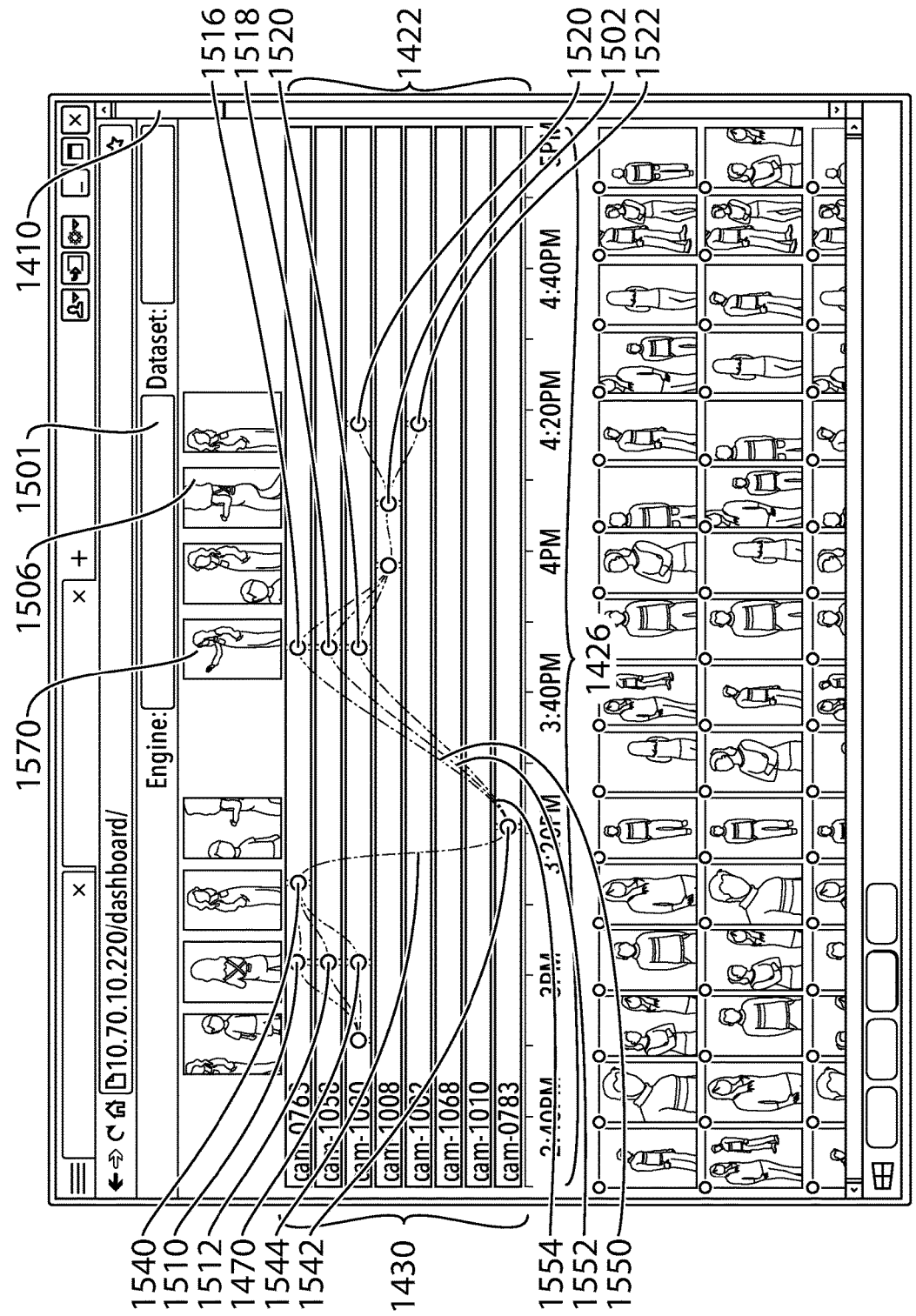
FIG. 15 illustrates the example user interface page of FIG. 14 in a state where more thumbnails have been reviewed and selected as being a match to a person or object of interest.

Reference will now be made to FIG. 15. FIG. 15 illustrates the impact on elements displayed in the user interface 1410, relative to what is shown in FIG. 14, after more of the thumbnails below the graph 1422 are clicked on. The main interactive changes occurring when more thumbnails are clicked on are that more markers appear on the graph 1422, more thumbnails are appearing above the graph 1422 and thumbnails below the graph 1422 become rearranged and changed (including the addition of new thumbnails not previously shown and the removal of thumbnails no longer having a sufficient match likelihood). It will be noted that each time one of the thumbnails is clicked on this adds new information in terms of what is likely to be and what is not likely to be a match. In other words, the new information is relevant to searches. In some examples, the system takes the user's feedback to refine the search results (by merging the result of multiple query images). In such examples the user interface can allow for collecting the feedback of the user for the purpose of collecting ground truth data that can be used to refine an engine (or to train a new engine). This feedback mechanism can be used to create a system that evolves by continuously and automatically learning from users.

Thus, an updated search is run whenever one of the thumbnails is clicked on. Also, a selector 1501 is provided to permit selecting a different engine (neural network) to run the search should this be desired. As will be appreciated by those skilled in the art, different search results will be produced whenever a different engine is used to run a search. Thus, in some examples it is possible to allow the computer terminal user to try running a search on different engines until he has decided upon an engine that is more suitable than others for his purpose. Thus, the selector 1501 allows toggling between different engines, or even to choose multiple engines. With respect to multiple engines, selected algorithms can be used (rank fusion, or feature fusion) that combine the results of multiple engines, in the goal of yielding results that are in average better than the each of the engines alone.

Regarding example marker 1502 having an x coordinate on the x-axis 1426 at the time interval of 4:10 PM to 4:19.59 PM and having a y coordinate on the y-axis 1430 corresponding to the camera "cam-1008". This is a new marker meaning that at some point between illustrated user interface states shown in FIGS. 14 and 15, a user of the computer terminal 104 (FIG. 1) selected thumbnail 1506 to indicate it as a match for the girl of interest causing it to move up from a vertically aligned column (below the graph 1422) to the shown location above the graph 1422.

It will be noted that for some time intervals there are multiple markers. In the illustrated example, the time interval of 3:00 PM to 3:09.59 PM includes three markers 1510, 1512 and 1470, the time interval of 3:50 PM to 3:59.59 PM includes three markers 1516, 1518 and 1520, and the time interval of 4:20 PM to 4:29.59 PM includes two markers 1520 and 1522. Also, as regards to a marker falling within one time interval and a marker falling within a next time interval, a line is created between the two markers. For example, marker 1540 falls with the time interval of 3:10 PM to 3:19.59 PM, and marker 1542 is in the next later time interval of 3:20 PM to 3:29.59 PM, and so there is a line 1544 between the marker 1540 and the marker 1542. Lines between markers on the graph 1422 have a similar practical significance to the lines 560 that connect thumbnails in the previously discussed FIG. 3 embodiment. Namely each of the lines between the markers connect to other line(s) such that a path is constructed on the graph 1422 showing how and when the individual or object of interest moved between the video cameras listed along the y-axis 1430.

It will be noted that there can be more than one line between markers in a first time interval and a next later time interval. For example, there are three lines between a marker 1542 in the time interval of 3:20 PM to 3:29.59 PM and the markers 1516, 1518 and 1520 in the time interval of 3:50 PM to 3:59.59 PM. A first line 1550 connects the marker 1542 in the time interval of 3:20 PM to 3:29.59 PM to the marker 1516 in the time interval of 3:50 PM to 3:59.59 PM. A second line 1552 connects the marker 1542 in the time interval of 3:20 PM to 3:29.59 PM to the marker 1518 in the time interval of 3:50 PM to 3:59.59 PM. A third line 1554 connects the marker 1542 in the time interval of 3:20 PM to 3:29.59 PM to the marker 1520 in the time interval of 3:50 PM to 3:59.59 PM.

As previously mentioned, the time interval of 3:50 PM to 3:59.59 PM includes three markers 1516, 1518 and 1520. Since there are three markers in this time interval, this means that three thumbnails were clicked on in the thumbnail column for that time interval, and furthermore those three thumbnails have been cause to move above the graph 1422. Nonetheless, only a single thumbnail 1570 is visible because of the space constraint within the user interface 1410. In some examples, the two hidden thumbnails can be revealed, the manner in which will now be described with reference to FIG. 16.

Figure 16:
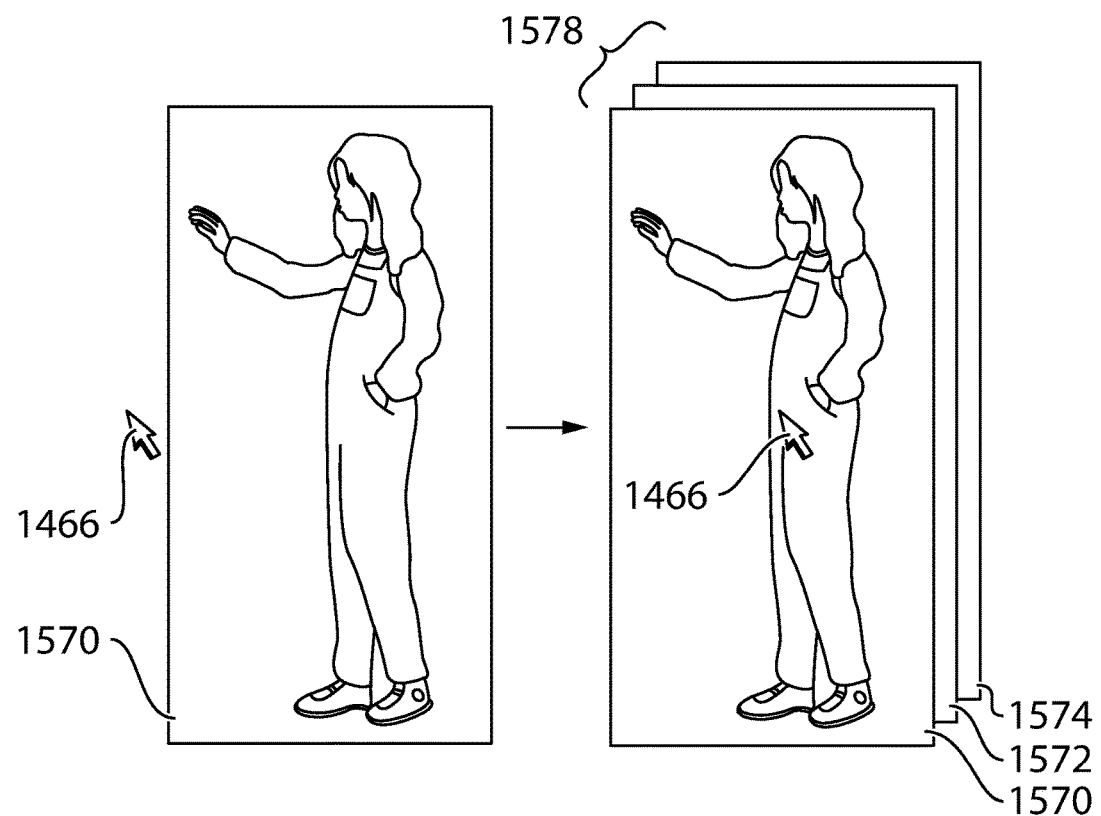
FIG. 16 illustrates one of the thumbnails shown in FIG. 15 in more detail.

FIG. 16 is a close-up illustration of the user interface 1410 within the region of the thumbnail 1570. On the left side of FIG. 16, the cursor 1466 is beside the thumbnail 1570. The next action is for the user to move and position the cursor 1466 over the thumbnail 1570 as shown on the right side of FIG. 16. By doing this, two hidden thumbnails 1572 and 1574 of thumbnails set 1578 become revealed. Should the user like to bring one of the thumbnails 1572 and 1574 to the front so as to become fully revealed, the user can intuitively move the cursor over either the thumbnail 1572 or 1574 and then click on it. Also, it will be understood that when the clicked on thumbnail moves to the front, the thumbnail holding the front (revealed) position must move to a back location. Thus movement of thumbnails within the set 1578 can be analogized to shuffling of cards within a deck.

Figure 17:
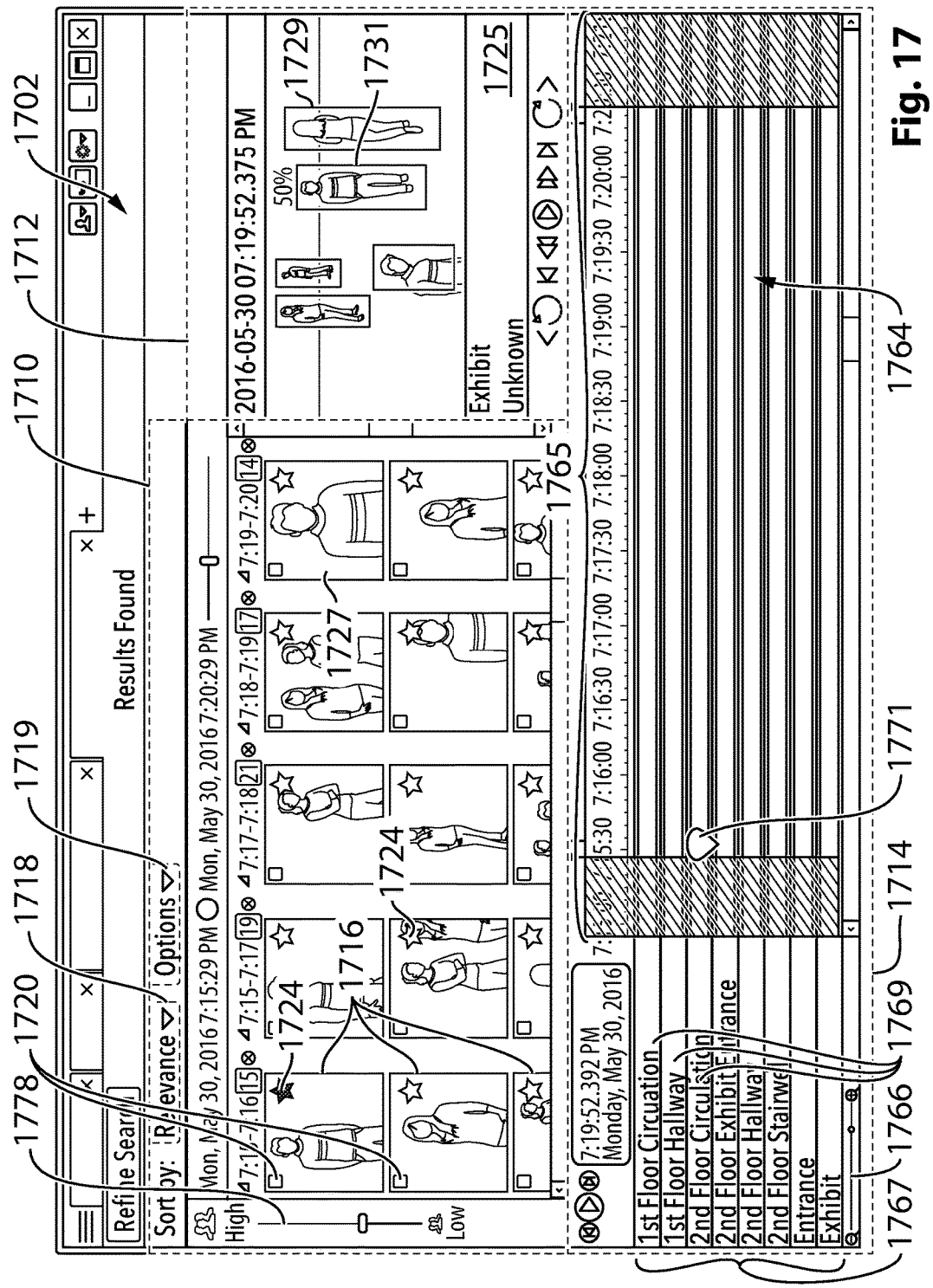
FIG. 17 illustrates another example user interface page, for the client-side video review application of FIG. 13, this user interface page being divided into three main functional regions.

Reference will now be made to FIG. 17 which is a screen shot of another example user interface page 1702, which can be interacted with for identifying same individuals or objects in video recordings in accordance with another example embodiment. The user interface page 1702 is divided into three functional regions: a first UI region 1710, a second UI region 1712 and a third UI region 1714. Within the first UI region 1710, slider tool 1778 functions in a manner similar to the slider tool 1078 previously discussed in connection with FIG. 11, and thus the slider tool 1778 allows a person interacting with the user interface page 1702 to set a filtering threshold as to which thumbnails are permitted to appear on the user interface page 1702. Each of the thumbnails 1716 with the user interface page 1702 are organized into columns based on the time interval within which the portion of the video recording associated with the thumbnail falls. Starting from the leftmost column, this column is assigned the time interval of 7:15 PM to 7:16 PM. Then the next column is assigned the time interval of 7:16 PM to 7:17 PM, and so on. Thus the organization of thumbnails in the thumbnail columns within the user interface page 1702 has similarity to the organization of thumbnails in the thumbnail columns within the user interface page 1410 previous described in connection with FIGS. 14 and 15. It is also noted that there are drop-down selectors 1718 and 1719 provided within the first UI region 1710. The drop-down selector 1718 impacts how the thumbnails 1716 are organized within each of their respective columns. In the illustrated example, the drop-down selector 1718 has been set to "Relevance". This means that thumbnails corresponding to portions of videos where there is a higher likelihood of appearance of the individual or object of interest will appear closer to the top of the first UI region 1710 than the ones corresponding to lower likelihood of appearance. The drop-down selector 1719 is labelled "Options" and allows the computer terminal user, once clicked on, to pick other search-related option such as, for example, initiate an export of all starred results or bookmark all the starred results. As will be appreciated by those skilled in the art, "export" in the context of recorded video means to move or copy video recording(s) or parts of video recording(s) from one device to another device (for example, for the purpose of backing up or otherwise saving what is being moved or copied). "Bookmark" means to create an electronic marker or index to make it easier for the computer terminal user to return to specific part(s) of video recording(s).

It will be noted that each of the thumbnails 1716 includes a square graphic 1720 in the upper left corner of the thumbnail and a star graphic 1724 in the upper right corner of the thumbnail. These graphics are superimposed over the images on the thumbnails 1716. The star graphic 1724 can be clicked on to indicate that the object or person of interest is contained in the portion of the video recording corresponding to that thumbnail. When this occurs (also herein referred to as "starring" a result) the star graphic 1724 may change from a light, translucent shading to a solid bright color (although in the illustrated example color is not shown, the star graphic on the upper left of the thumbnails 1716 has been clicked on to indicate a match whereas the other thumbnails 1716 are not). Alternatively the star graphic 1724 may change in some other manner when clicked on such as, for example, becoming continuously animated once selected to indicate the match. Regarding the square graphic 1720 in the upper left corner of each of the thumbnails 1716, this can be clicked on to indicate that the object or person of interest is not contained in the portion of the video recording corresponding to that thumbnail. When this occurs, a red "X" may appear within the square graphic 1720 to provide visual indication of what has occurred. Also, those skilled in the art will appreciate that the red "X" is simply one of many possible design choices that can achieve the same result of providing the desired indication of a non-match. In some examples, the thumbnails in the columns will re-position themselves amongst each other when a user clicks on one or more of the thumbnails to indicate matches and/or non-matches. In other examples, the thumbnails in the columns will remain in a static position when a user clicks on one or more of the thumbnails to indicate matches and/or non-matches.

A video player 1725 is included in the second UI region 1712 within the user interface page 1702. In the illustrated example, the video player 1725 is playing the portion of the video recording corresponding to thumbnail 1727. In this manner the computer terminal user can watch the portion of the video recording and hopefully by watching this the computer terminal user can see or notice something that will allow a decision to be made as to whether or not the individual or object of interest actually appears in the portion of the video recording corresponding to the thumbnail 1727. In the illustrated example, bounding boxes, such as bounding boxes 1729 and 1731, appear around a number of moving objects and persons within the displayed video. The bounding box 1731 has the percentage "50%" shown just above the top of the bounding box to indicate to the computer terminal user that the person within the bounding box 1731 is calculated to have a 50% likelihood of being the person of interest. By contrast, the bounding box 1729 does not have any percentage shown above it. In some examples, whether a percentage is or is not shown will depend upon whether a likelihood of appearance threshold is exceeded (i.e. the likelihood of appearance information will only appear if it is sufficiently high).

It will be understood that the video player 1725 does not limit the computer terminal user to just watching the portion of the video recording corresponding to the thumbnail 1727. The computer terminal user can watch other video including those corresponding to any of the thumbnails 1716 shown in the first UI region 1710. In accordance with at least one example embodiment, single clicking on any of the thumbnails 1716 will bring the user to a starting point in the portion of the video corresponding to that thumbnail. By contract, double clicking on any of the thumbnails 1716 will bring the user to the exact point in the video as shown in the thumbnail image.

Within the third UI region 1714 is a two dimensional graph 1764. The two dimensional graph 1764 includes date and time along x-axis 1765. In the illustrated example, each thirty second interval is labelled starting at 7:15 PM at the far left of the x-axis 1765 and ending at 7:21 PM at the far right of the x-axis 1765. In at least some examples, the interval of time between the two ends of the x-axis 1765 can be increased or decreased. For instance, the illustrated user interface page 1702 includes a slider tool 1766 similar to the slider tool 538 described in connection with the user interface page 510 (FIG. 3).

The two dimensional graph 1764 also includes, along a y-axis 1767 of the graph 1764, a listing of a plurality of camera identifications 1769 of video cameras with respect to which a respective plurality of video recordings of the video cameras are available for viewing. Each one of the plurality of camera identifications 1769 corresponds to a respective one of the plurality of video cameras 169 (FIG. 1) that is located in a unique known physical location with respect to all locations of the plurality of video cameras 169 of the surveillance system 100. The organization of the listing of the plurality of camera identifications 1769 may be such that it is in descending order (from top to bottom) based those camera identification having the most markers. Alternatively other forms of organization of the listing of the plurality of camera identifications 1769 are contemplated. In at least one alternative example, the listing of the plurality of camera identifications 1769 can be made shorter by only showing those cameras having at least one starred result.

Still with reference to the third UI region 1714, there is a marker 1771 plotted at roughly 7:15.30 PM. In this illustrated example, the marker 1771 corresponds to the thumbnail in the top left corner of the first UI region 1710 which, as mentioned, has been marked as a match for the object or person of interest. To make the correspondence between the marker 1771 and the corresponding thumbnail more apparent, the marker can be displayed in a same color as the star graphic on the thumbnail.

Figure 18A:
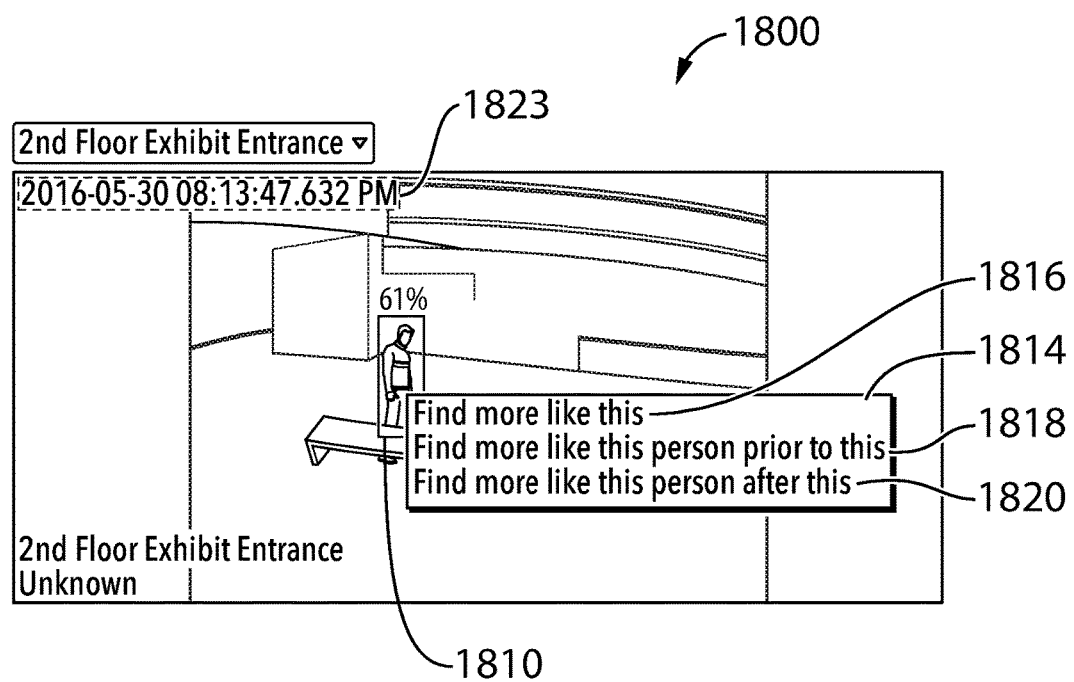
FIG. 18A illustrates an example video player which can be included in user interface pages such as those illustrated in any one of FIGS. 12, 17 and 20 to 22.

Reference will now be made to FIG. 18A which illustrates an example video player 1800 in accordance with some example embodiments. The video player 1800 can be similar to the video player 1725 included in the interface page 1702 (FIG. 17) and in fact could certainly be used within such an interface page. Likewise the video player 1800 can be similar to any one of the video players included in the interface pages illustrated in FIGS. 12, 17 and 20 to 22 and in fact could certainly be used within any one of those interface pages as well.

Within video being shown on the video player 1800 there is a bounding box 1810 surrounding a man shown in the video. By right clicking on the bounding box 1810, a selection list 1814 appears with a number of option for running a search. Clicking on selection option 1816 ("Find more like this") initiates a search of stored video within the storage 190 (FIG. 1) for anyone that may be likely to match the person within the bounding box 1810. Clicking on selection option 1818 ("Find more like this person prior to this") initiates a similar search; however a more restricted search in the sense that the search will be limited to video occurring prior in time to date/time stamp 1823 of the displayed frame in the video. Clicking on selection option 1820 ("Find more like this person after this") initiates a search that is the complement of the search initiated by choosing the option 1818 (i.e. the search will be limited to video occurring afterwards in time relative to date/time stamp 1823 of the displayed frame in the video).

An example of a person losing his bag in a mall is presently described to show why the restricted search options (i.e. the options 1818 and 1820) might be selected over the option 1816. So if a person loses his bag in a mall, the following should be true: i) at one point in time the person was within the mall carrying the bag; and ii) at a later point in time the person was within the mall not carrying the bag. So when the person goes to the security office of the mall, a security guard can start looking at videos in a video player. As soon as the security guard finds the person in a portion of a video recording taken at the mall, he can look at the relevant video frames and see whether the person is carrying or is not carrying the bag at that time. If it is the case that the person is carrying the bag in those video frames, then the security guard can select the option 1820 because searching backwards in time will not be of assistance in trying to find any video of the person at the moment where the bag was lost. By contrast, if it is the case that the person is not carrying the bag in those video frames, then the security guard can select the option 1818 because searching forwards in time will not be of assistance in trying to find any video of the person at the moment where the bag was lost. It should be noted that, to initiate the above described search, it is not critical that the security guard find the person in some portion of a video recording taken at the mall. Instead the security guard could, for example, direct the person to stand in front of a video camera in or nearby to the security office. The security guard would then have recorded video images of the person which could then be used to initiate the search.

Figure 18B:
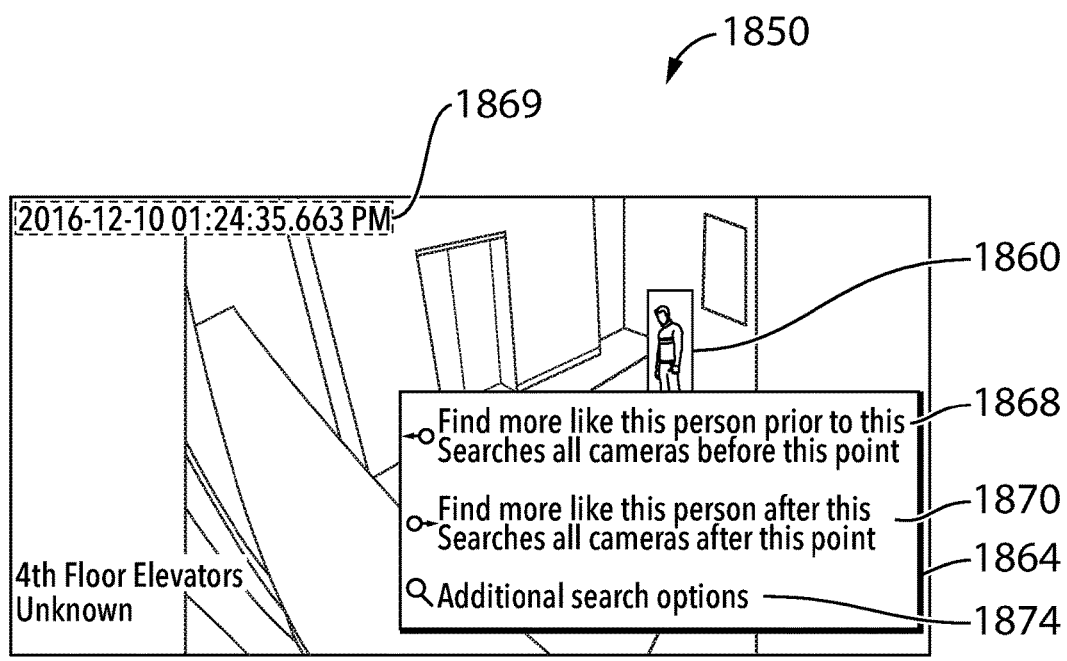
FIG. 18B illustrates another example video player which can be included in user interface pages such as those illustrated in any one of FIGS. 12, 17 and 20 to 22.

Reference will now be made to FIG. 18B which illustrates another example video player 1850 in accordance with some example embodiments. The video player 1850 can be similar to the video player 1725 included in the interface page 1702 (FIG. 17) and in fact could certainly be used within such an interface page. Likewise the video player 1850 can be similar to any one of the video players included in the interface pages illustrated in FIGS. 12, 17 and 20 to 22 and in fact could certainly be used within any one of those interface pages as well.

Within video being shown on the video player 1850 there is a bounding box 1860 surrounding a man shown in the video. By right clicking on the bounding box 1860, a selection list 1864 appears with a number of option for running a search. Clicking on selection option 1868 ("Find more like this person prior to this") initiates a search of stored video within the storage 190 (FIG. 1) for anyone that may be likely to match the person within the bounding box 1860, but limited to video occurring prior in time to date/time stamp 1869 of the displayed frame in the video. Clicking on selection option 1870 ("Find more like this person after this") initiates a search that is the complement of the search initiated by choosing the option 1868 (i.e. the search will be limited to video occurring afterwards in time relative to date/time stamp 1869 of the displayed frame in the video). Clicking on selection option 1874 ("Additional Search Options") allows the computer terminal user to pick other search-related option such as, for example, initiate an export of all starred results or bookmark all the starred results. These options have already been herein discussed.

Figure 19:
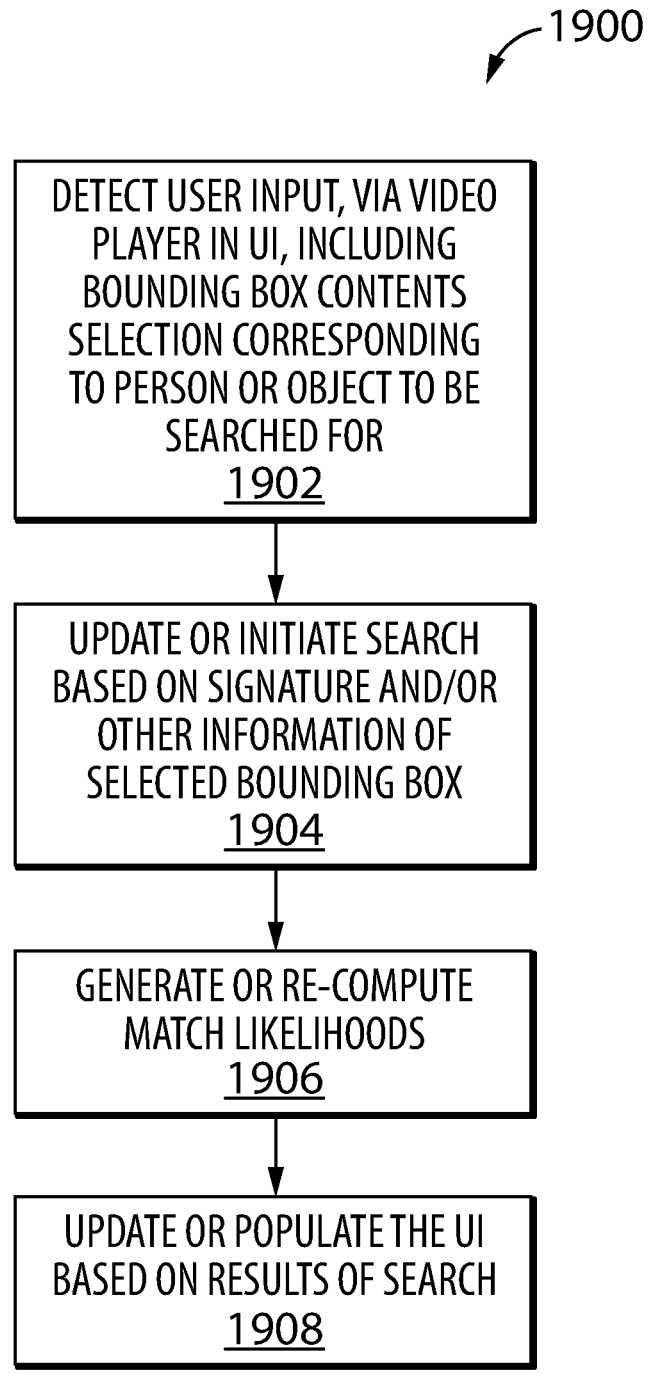
FIG. 19 is a flow chart illustrating a second user interface-driven method in accordance with some example embodiments.

Reference will now be made to FIG. 19 which is a flow chart that illustrating a method 1900 in accordance with some example embodiments. As a first action in the illustrated method 1900, the client-side video review application 144 (FIG. 2) or the client-side video review application 144' (FIG. 13) detects a user input, via a video player (e.g. the video player 1800 or the video player 1850) in the user interface, including bounding box contents selection corresponding to the person or object to be searched for. As described in connection with the example illustrated in FIG. 18A or 18B, the computer terminal user can right click the bounding box 1810 (or the bounding box 1860) to be presented with different options for selecting a particular type of search to be run. Of course right clicking to bring up a selection list is just one example of a mechanism for providing the input through the user interface. Other alternative mechanisms will be readily apparent to those skilled in the art.

Next the method includes updating or initiating (1904) a search based on a signature and/or other information of the contents of the selected bounding box. Returning to the example of FIG. 18A or 18B, updating or initiating of a search in that example follows from one of the selectable options being clicked on to cause the computer terminal 104 (FIG. 1) to send a request to the server system 108 for a search of the stored video within the storage 190 to find anyone that may be likely to match the person within the bounding box 1810 (or the bounding box 1860). Of course it will be understood that searches are not limited to just searching for people. For instance, in some examples, instead of looking for a person the search could be for a car or other motorized vehicle. One might want to search for a car (or other motorized vehicle) if it has disappeared and searching video from various cameras in the vicinity of where the car may have traveled may reveal information about who may have the car or where the car may have been taken to.

Next the method includes generating or re-computing (1906) the match likelihoods. It will be appreciated that match likelihoods change as a search is updated or newly run. This is because the system processing the information that the contents of the bounding box 1810 (or the bounding box 1860) are a match impacts values of inputs to computational formulas used by the analytics engine module 172 to assign likelihoods of matches with respect to persons in other frames of other videos.

Finally the method includes updating or populating (1908) the user interface based on the results of the search. For example, as has already been herein extensively described, image thumbnails, which are visually representative of portions of potentially relevant video recordings, can be dynamically presented on a user interface screen. In the case of an initial search, an empty portion of a user interface screen can become filled up with thumbnails that the search determined to be potentially relevant. In the case of an updated search, thumbnails presented on a portion of a user interface screen at a pre-search point in time can become rearranged within the user interface and/or a number of such thumbnails can be caused to be replaced with other thumbnails based on the search results.

Figure 20:
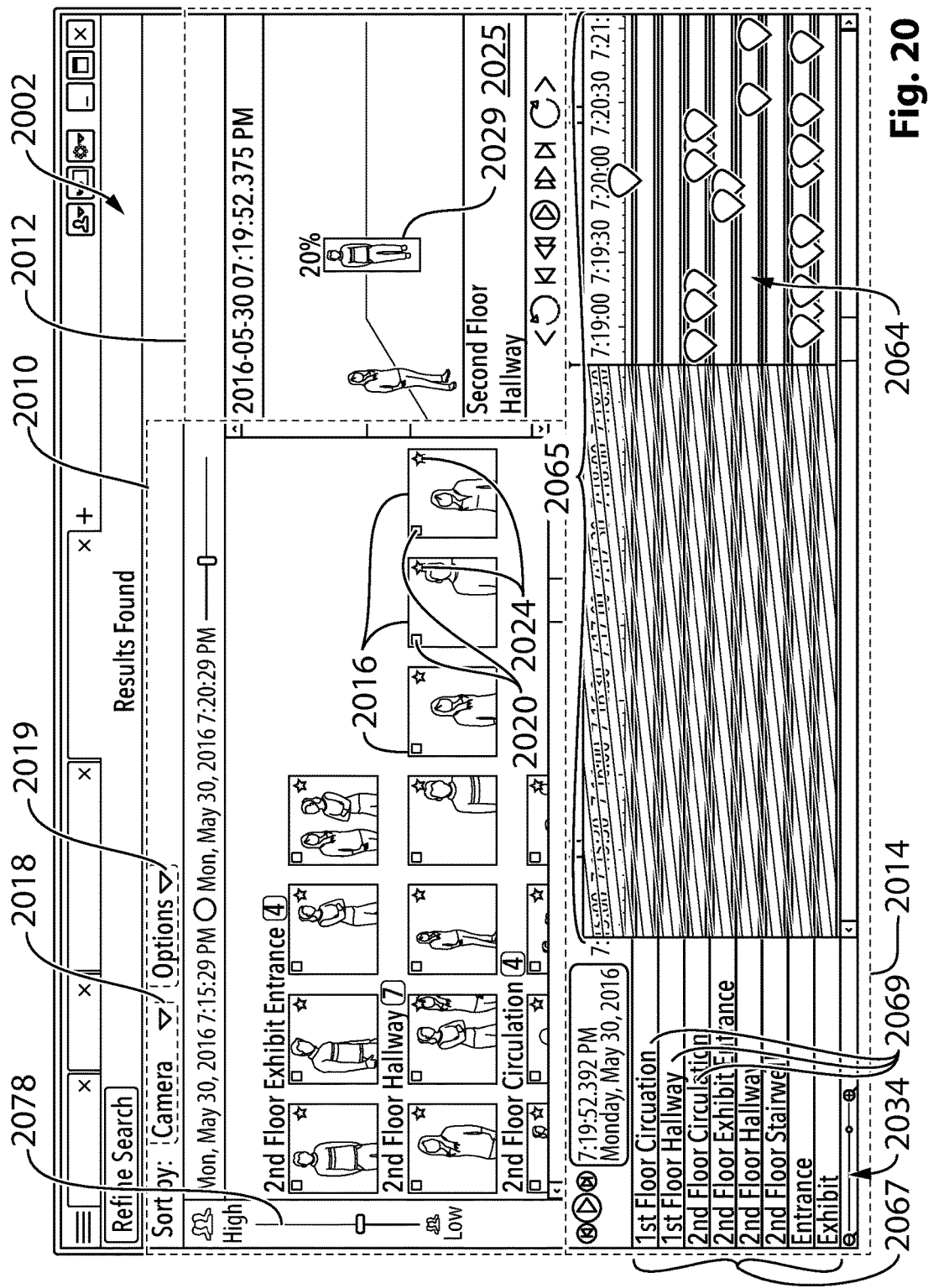
FIG. 20 illustrates another example user interface page, for the client-side review application of FIG. 13, this user interface page again being divided into three main functional regions.

Reference will now be made to FIG. 20 which is a screen shot of another example user interface page 2002, which can be interacted with for identifying same individuals or objects in video recordings in accordance with another example embodiment. Similar to previously described user interface page 1702 (FIG. 17), the user interface page 2002 is divided into three functional regions: a first UI region 2010, a second UI region 2012 and a third UI region 2014. Within the first UI region 2010, slider tool 2078 functions in a manner similar to the slider tool 1078 previously discussed in connection with FIG. 11, and thus the slider tool 2078 allows a person interacting with the user interface page 2002 to set a filtering threshold as to which thumbnails are permitted to appear on the user interface page 2002. Each of the thumbnails 2016 with the user interface page 2002 are organized according to which of the video cameras 169 (FIG. 1) that are identified as haven taken the portions of the video recordings corresponding to the illustrated thumbnails 2016. Thus, it will be seen that there are four thumbnails available under camera "2nd Floor Exhibit Entrance". There are seven thumbnails available under camera "2nd Floor Hallway". Finally, there are four thumbnails available under camera "2nd Floor Circulation". It is also noted that there are drop-down selectors 2018 and 2019 provided within the first UI region 2010. The drop-down selector 2018 impacts how the thumbnails 2016 are organized. As has been previously discussed, organization by some parameter other than specific video camera is possible. The drop-down selector 2019 is labelled "Options" and allows the computer terminal user, once clicked on, to pick other search-related option such as, for example, initiate an export of all starred results or bookmark all the starred results. These options have already been herein discussed.

It will be noted that each of the thumbnails 2016 includes a square graphic 2020 in the upper left corner of the thumbnail and a star graphic 2024 in the upper right corner of the thumbnail. These graphics are superimposed over the images on the thumbnails 2016. The star graphic 2024 can be clicked on to indicate that the object or person of interest is contained in the portion of the video recording corresponding to that thumbnail. When this occurs, the star graphic 2024 may change from a light, translucent shading to a solid bright color (as was previous described in connection with the user interface page 1702 illustrated in FIG. 17). Thus, the search result corresponding to the thumbnail is starred. Alternatively the star graphic 2024 may change in some other manner when clicked on such as, for example, becoming continuously animated once selected to indicate the match. Regarding the square graphic 2020 in the upper left corner of each of the thumbnails 2016, this can be clicked on to indicate that the object or person of interest is not contained in the portion of the video recording corresponding to that thumbnail. When this occurs, a red "X" may appear within the square graphic 1720 to provide visual indication of what has occurred. Also, those skilled in the art will appreciate that the red "X" is simply one of many possible design choices that can achieve the same result of providing the desired indication of a non-match.

A video player 2025 is included in the second UI region 2012 within the user interface page 2002. In the illustrated example, the video player 2025 is playing a portion of the video recording not necessarily corresponding to any of the thumbnails shown in the first UI region 2010. The computer terminal user can watch the portion of the video recording and, by watching this, the computer terminal user may see or notice something that will allow a decision to be made as to whether or not an individual or object of interest appears in the portion of the video recording so as to warrant updating or initiating a search for the individual or object of interest (for example, in accordance with the method 1900 shown and described in connection with FIG. 19). In accordance with at least one example embodiment, single clicking on any of the thumbnails 2016 will bring the user to a starting point in the portion of the video corresponding to that thumbnail. By contract, double clicking on any of the thumbnails 2016 will bring the user to the exact point in the video as shown in the thumbnail image.

Within the illustrated example video player 2025, a bounding box 2029 appears around a moving person within the displayed video. The bounding box 2029 has the percentage "20%" shown just above the top of the bounding box to indicate to the computer terminal user that the person within the bounding box 2029 is calculated to have a 20% likelihood of being the person of interest.

Within the third UI region 2014 is a two dimensional graph 2064. The two dimensional graph 2064 includes date and time along x-axis 2065. In the illustrated example, each thirty second interval is labelled starting at 7:16.30 PM near the far left of the x-axis 2065 and ending at 7:21.00 PM at the far right of the x-axis 2065. In at least some examples, the interval of time between the two ends of the x-axis 2065 can be increased or decreased. For instance, the illustrated user interface page 2002 includes a slider tool 2034 similar to the slider tool 538 described in connection with the user interface page 510 (FIG. 3).

The two dimensional graph 2064 also includes, along a y-axis 2067 of the graph 2064, a listing of a plurality of camera identifications 2069 of video cameras with respect to which a respective plurality of video recordings of the video cameras are available for viewing. Each one of the plurality of camera identifications 2069 corresponds to a respective one of the plurality of video cameras 169 (FIG. 1) that is located in a unique known physical location with respect to all locations of the plurality of video cameras 169 of the surveillance system 100. The organization of the listing of the plurality of camera identifications 2069 may be such that it is in descending order (from top to bottom) based those camera identification having the most markers. Alternatively other forms of organization of the listing of the plurality of camera identifications 2069 are contemplated. In at least one alternative example, the listing of the plurality of camera identifications 2069 can be made shorter by only showing those cameras having at least one starred result.

Figure 21:
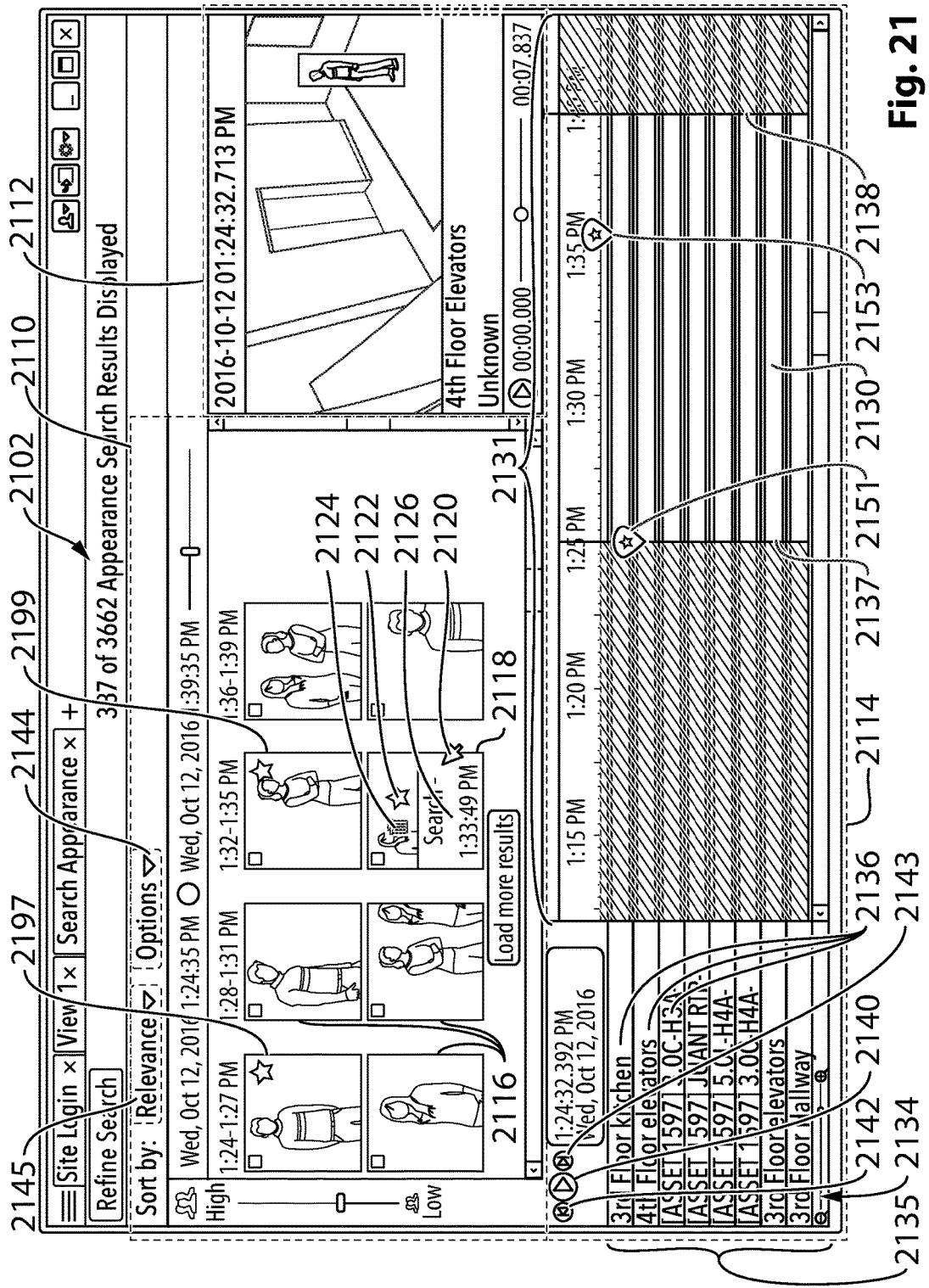
FIG. 21 illustrates yet another example user interface page, for the client-side review application of FIG. 13, this user interface page again being divided into three main functional regions.

Reference will now be made to FIG. 21 which is a screen shot of another example user interface page 2102, which can be interacted with for identifying same individuals or objects in video recordings in accordance with another example embodiment. The user interface page 2102 is similar to the user interface page 2002 (FIG. 20) and is divided into three functional regions: a first UI region 2110, a second UI region 2112 and a third UI region 2114, the general functions of which have been previously described. Each of the thumbnails 2116 with the user interface page 2102 are organized into columns based on the time interval within which the portion of the video recording associated with the thumbnail falls. A thumbnail 2118 has a cursor 2120 hovering over it causing what is shown on the thumbnail 2118 to assume a different makeup as compared to one of the thumbnails 2116. Star icon 2122, when clicked on, allows the search result associated with the thumbnail 2118 to be starred. Garbage can icon 2124, when clicked on, allows the thumbnail 2118 to be marked as not of interest and removed from the first UI region 2110. There is also superimposed text 2126 indicating a video record instance of time corresponding to thumbnail image.

Turning now to the third UI region 2114, illustrated is a two dimensional graph 2130. The two dimensional graph 2130 includes date and time along x-axis 2131. In the illustrated example, the time interval labelling is similar to the time interval labelling previously described in connection with FIG. 17. Also, the interval of time between the two ends of the x-axis 2131 can be increased or decreased. For instance, the user interface page 2102 includes a slider tool 2134, within the third UI region 2114, for this purpose.

The two dimensional graph 2130 also includes, along a y-axis 2135 of the graph 2130, a listing of a plurality of camera identifications 2136 of video cameras with respect to which a respective plurality of video recordings of the video cameras are available for viewing. Each one of the plurality of camera identifications 2136 corresponds to a respective one of the plurality of video cameras 169 (FIG. 1) that is located in a unique known physical location with respect to all locations of the plurality of video cameras 169 of the surveillance system 100. The organization of the listing of the plurality of camera identifications 2136 may be such that it is in descending order (from top to bottom) based those camera identification having the most markers. Alternatively other forms of organization of the listing of the plurality of camera identifications 2136 are contemplated. In at least one alternative example, the listing of the plurality of camera identifications 2136 can be made shorter by only showing those cameras having at least one starred result.

Still with reference to the two dimensional graph 2130, there are two vertical (i.e. parallel to the y-axis 2135) lines 2137 and 2138. The positions of the lines 2137 and 2138 can be changed (for example, through use of the cursor 2120) to change the time range of the search results. By moving the line 2137 leftwards and/or the line 2138 rightwards, the time range of the search results can be expanded. Conversely, by moving the line 2137 rightwards and/or the line 2138 leftwards, the time range of the search results can be contracted. Having described the function of the vertical lines 2137 and 2138 in FIG. 21, it will be appreciated that similar vertical lines present in similar UI regions of FIGS. 17 and 20 can, in at least some examples, function similarly.

Still with reference to the third UI region 2114, play button icon 2140 is now described. Clicking the play button icon 2140 causes the starred video recording portions to be played back-to-back (i.e. the results associated with the thumbnail icons 2197 and 2199). Also, on opposite sides of the play button icon 2140 are additional button icons 2142 and 2143. Clicking on the button icon 2142 causes the playback speed of a video recording portion to be slowed down. Clicking on the button icon 2143 causes the playback speed of a video recording portion to be speed up.

With reference again to the first UI region 2110, drop-down selector 2144 is labelled "Options" and serves the same function as the same labelled selector shown in previously described FIGS. 17 and 20. In accordance with at least one example embodiment, "Export" can be one of the selections of the drop-down selector 2144 and by choosing it a new user interface window 2202 (FIG. 22) is generated.

Another drop-down selector 2145 is also shown within the first UI region 2110. The drop-down selector 2145 serves a similar function as the function of the drop-down selector 1718 shown in FIG. 17.

Figure 22:
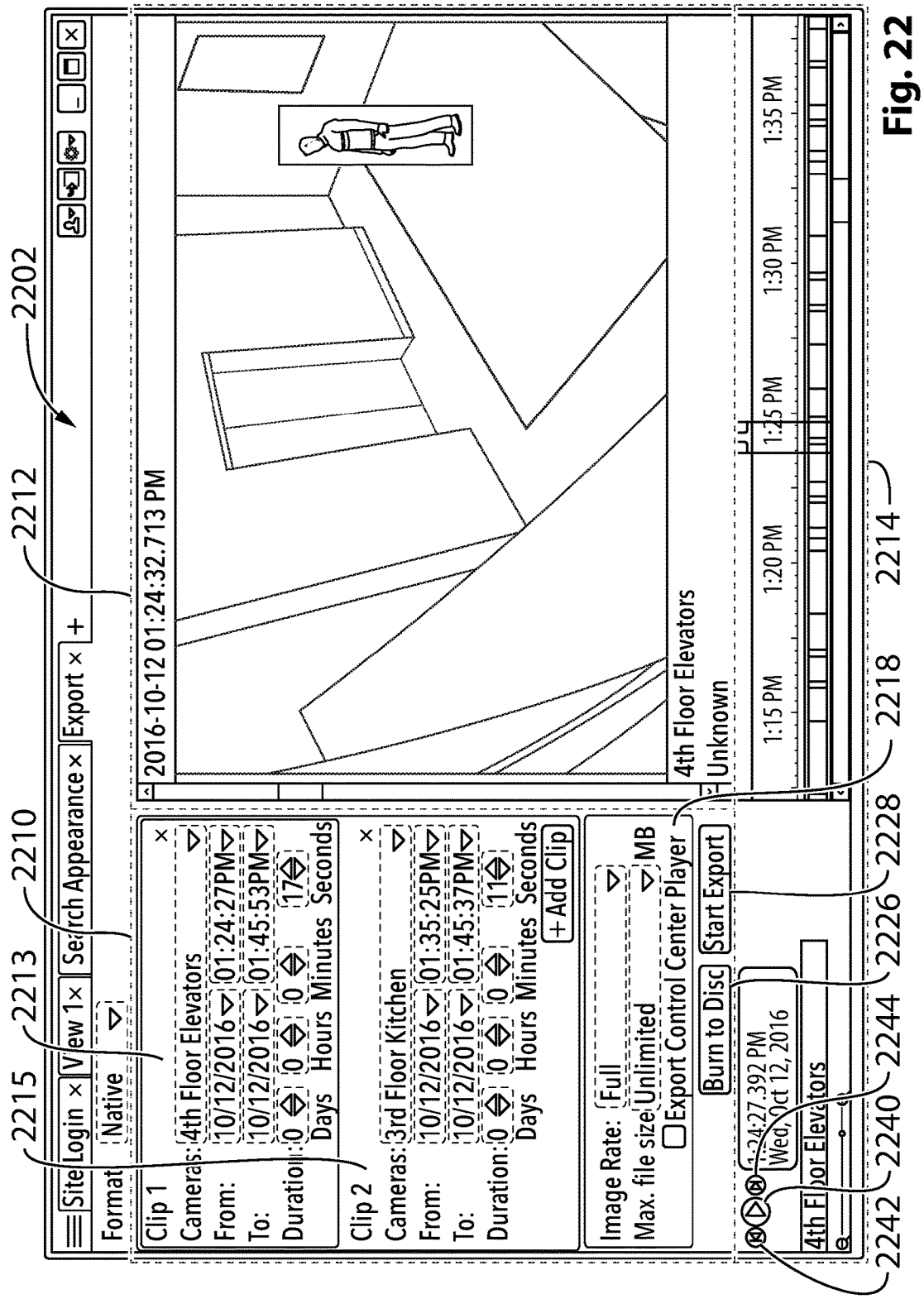
FIG. 22 illustrates another example user interface page, for the client-side review application of FIG. 13, this user interface page associated with an export function of the client-side review application.

Reference will now be made to FIG. 22 which is a screen shot of the user interface page 2202 associated with an export function of the client-side review application 144' (FIG. 13). The user interface page 2202 is divided into three functional regions: a first UI region 2210, a second UI region 2112 and a third UI region 2214 (the general functions of the second UI region 2212 have been previously described). Regarding the first UI region 2210, within this region are three interface tools: interface tool 2213 for "Clip 1", interface tool 2215 for "Clip 2" and interface tool 2218 for additional settings associated with the Clips 1 and 2. It will be understood that the Clips 1 and 2 correspond to the starred results of FIG. 21 (i.e. results associated with the thumbnail icons 2197 and 2199, having associated markers 2151 and 2153 on the two dimensional graph 2130). Also, the interface tools 2213 and 2215 include selectors to change the parameters of the video recording portions to be exported. For the illustrated example embodiment, any one or more of the following can be changed: camera, start date and time of Clip (labelled "From:"), end date and time of Clip (labelled "To:"), and duration in "Days", "Hours", "Minutes" and "Seconds".

Also within the first UI region 2210 are icons 2226 and 2228. The 2226 and 2228 are labelled "Burn to Disc" and "Start Export" respectively". By clicking on the icon 2226, the user can cause the back-to-back assembly of Clips 1 and 2 to be recorded onto a disc-type media (for example, CD-R, HD DVD, Blu-ray Disc, etc.). By clicking on the icon 2228, the user can cause the back-to-back assembly of Clips 1 and 2 to be recorded onto a storage within the local system (for example, on a hard disk). In accordance with at least one alternative example embodiment, additional icons are contemplated such as, for instance, an "Export to Cloud" icon allowing the back-to-back assembly of Clips 1 and 2 to be transmitted to (and stored in) a cloud storage.

In the third UI region 2214, there is a play button icon 2240. Clicking on the play button icon 2240 causes whatever is the currently selected video recording portion to be played. Also, on opposite sides of the play button icon 2240 are additional button icons 2242 and 2244. Clicking on the button icon 2242 causes playback speed of a video recording portion to be slowed down. Clicking on the button icon 2244 causes playback speed of a video recording portion to be speed up.

Certain adaptations and modifications of the described embodiments can be made. For example, with respect to either the client-side video review application 144 (FIGS. 1 and 2) or the client-side video review application 144' (FIG. 13), these have been herein described as packaged software installed on the client terminal 104; however in some alternative example embodiments implementation of the UI can be achieved with less installed software through the use of a web browser application (e.g. one of the other applications 152 shown in FIG. 1). A web browser application is a program used to view, download, upload, surf, and/or otherwise access documents (for example, web pages). In some examples, the browser application may be the well-known Microsoft® Internet Explorer®. Of course other types of browser applications are also equally possible including, for example, Google® Chrome™. The browser application reads pages that are marked up (for example, in HTML). Also, the browser application interprets the marked up pages into what the user sees rendered as a web page. The browser application could be run on the computer terminal 104 to cooperate with software components on the server system 108 in order to enable a computer terminal user to carry out actions related to providing input in order to facilitate identifying same individuals or objects appearing in a plurality of different video recordings. In such circumstances, the user of the computer terminal 104 is provided with an alternative example user interface through which the user inputs and receives information in relation to the video recordings.

Although example embodiments have described a reference image for a search as being taken from an image within recorded video, in some example embodiments it may be possible to conduct a search based on a scanned photograph or still image taken by a digital camera. This may be particularly true where the photo or other image is, for example, taken recent enough such that the clothing and appearance is likely to be the same as what may be found in the video recordings.

Therefore, the above discussed embodiments are considered to be illustrative and not restrictive, and the invention should be construed as limited only by the appended claims.

The invention claimed is:

1. A method comprising:
   providing a user interface which includes a video player for displaying video frames of a video, the video frames including a number of frame regions selectable for receiving user input;
   receiving search-requesting input through the user interface to carry out a forwards-in-time or backwards-in-time search for an individual present in a selected frame region of the frame regions, and the individual being shown in the selected frame region with a lost object for the forwards-in-time search or without the lost object for the backwards-in-time search;
   generating or re-computing a plurality of match likelihoods assigned to a plurality of individuals present in video recordings, the match likelihoods being likelihoods of there being an appearance of the individual;
   populating or updating a user interface page of the user interface to display information corresponding to the generated or re-computed match likelihoods; and
   building a timeline to show when or around when the individual lost the object.

2. The method as claimed in claim 1 wherein the method is carried out by a surveillance system that includes a computer terminal in communication with a server system, and the generating or re-computing is carried out by the server system.

3. The method as claimed in claim 2 wherein the populating or updating of the user interface page is carried out by the computer terminal.

4. The method as claimed in claim 2 wherein the frame regions are bounding boxes.

5. The method as claimed in claim 1 wherein the frame regions are bounding boxes.

6. The method as claimed in claim 1 wherein the user interface is configured to provide a selection list to facilitate the receiving of the search-requesting input.

7. At least one tangible, non-transitory, computer-readable storage medium having instructions encoded therein, wherein the instructions, when executed by at least one processor, cause a carrying out of a method comprising:
   providing a user interface which includes a video player for displaying video frames of a video, the video frames including a number of frame regions selectable for receiving user input;
   carrying out, using search-requesting input received through the user interface, a forwards-in-time or backwards-in-time search for an individual present in a selected frame region of the frame regions, wherein the individual is shown in the selected frame region with a lost object for the forwards-in-time search or without the lost object for the backwards-in-time search;
   generating or re-computing a plurality of match likelihoods assigned to a plurality of individuals present in video recordings, the match likelihoods being likelihoods of there being an appearance of the individual;
   populating or updating a user interface page of the user interface to display information corresponding to the generated or re-computed match likelihoods; and
   building a timeline to show when or around when the individual lost the object.

8. The at least one tangible, non-transitory, computer-readable storage medium as claimed in claim 7 wherein the frame regions are bounding boxes.

9. The at least one tangible, non-transitory, computer-readable storage medium as claimed in claim 7 wherein the user interface is configured to provide a selection list to facilitate receipt of the search-requesting input.

* * * * *